(12) United States Patent
Peng et al.

(10) Patent No.: US 11,212,036 B2
(45) Date of Patent: Dec. 28, 2021

(54) DATA COMMUNICATION METHOD, DEVICE, AND SYSTEM

(71) Applicant: HUAWEI TECHNOLOGIES CO., LTD., Shenzhen (CN)

(72) Inventors: Jinlin Peng, Shanghai (CN); Pengpeng Dong, Shanghai (CN); Pan Chen, Shanghai (CN); Pinlu Yang, Shanghai (CN); Yi Wang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 176 days.

(21) Appl. No.: 16/579,853

(22) Filed: Sep. 24, 2019

(65) Prior Publication Data

US 2020/0028618 A1  Jan. 23, 2020

Related U.S. Application Data

(63) Continuation of application No. PCT/CN2018/078926, filed on Mar. 14, 2018.

(30) Foreign Application Priority Data

Mar. 24, 2017 (CN) .......................... 201710184891.4

(51) Int. Cl.
*H04L 5/00* (2006.01)
*H04L 1/00* (2006.01)
(Continued)

(52) U.S. Cl.
CPC ......... *H04L 1/0057* (2013.01); *H04B 7/0408* (2013.01); *H04B 7/0456* (2013.01);
(Continued)

(58) Field of Classification Search
CPC ............. H04L 25/03929; H04L 1/1825; H04L 1/1896; H04B 7/0408; H04B 7/1855
See application file for complete search history.

(56) References Cited

U.S. PATENT DOCUMENTS

2010/0239035 A1  9/2010  Blankenship et al.
2011/0268093 A1* 11/2011  Dai .......................... H04L 1/06
                                                                      370/335
(Continued)

FOREIGN PATENT DOCUMENTS

CN        101465718 A      6/2009
CN        104124987 A     10/2014
(Continued)

OTHER PUBLICATIONS

R1-1702071, "Multi-panel/multi-TRP transmission", Feb. 12, 2017, pp. 1-6 (Year: 2017).*
(Continued)

*Primary Examiner* — Salvador E Rivas
(74) *Attorney, Agent, or Firm* — Hauptman Ham, LLP

(57) ABSTRACT

Various embodiments provide a data communication method. Under the method, a transmit end maps each code block group CBG in N CBGs to each layer in a corresponding layer group based on a correspondence between the N CBGs and N layer groups. Each layer group includes at least one layer, and N is a positive integer. The transmit end then sends data to a receive end. T transport block corresponding to the data includes the N CBGs. In this way, a mapping relationship between a CBG and a layer group is established by grouping layers, so as to improve data reception quality, through interference cancellation, for transmission among different layer groups, and ensure adaptivity to a CBG-based retransmission feedback, thereby optimizing transmission performance of an entire communications system.

20 Claims, 13 Drawing Sheets

(51) Int. Cl.
  *H04B 7/0456* (2017.01)
  *H04L 27/26* (2006.01)
  *H04W 72/04* (2009.01)
  *H04L 1/18* (2006.01)
  *H04B 7/0408* (2017.01)
  *H04B 7/185* (2006.01)

(52) U.S. Cl.
  CPC .......... *H04L 1/1825* (2013.01); *H04L 1/1896* (2013.01); *H04L 5/0007* (2013.01); *H04L 5/0048* (2013.01); *H04L 27/2691* (2013.01); *H04W 72/046* (2013.01); *H04B 7/1855* (2013.01)

(56) References Cited

U.S. PATENT DOCUMENTS

| | | | |
|---|---|---|---|
| 2014/0112312 | A1 | 4/2014 | Kim et al. |
| 2014/0321582 | A1 | 10/2014 | Cheng et al. |
| 2016/0088644 | A1 | 3/2016 | Au et al. |
| 2020/0036482 | A1* | 1/2020 | Park ..................... H04L 1/1861 |

FOREIGN PATENT DOCUMENTS

| | | |
|---|---|---|
| CN | 105281868 A | 1/2016 |
| CN | 105744277 A | 7/2016 |
| EP | 2501071 A2 | 9/2012 |
| EP | 2988447 A1 | 2/2016 |
| WO | 2010095900 A2 | 8/2010 |
| WO | 2010098532 A1 | 9/2010 |
| WO | 2010105564 A1 | 9/2010 |
| WO | 2010127622 A1 | 11/2010 |

OTHER PUBLICATIONS

R1-1703325, "Multi-bit feedback for NR HARQ operation", Feb. 13-17, 2017, pp. 1-6 (Year: 2017).*

3GPP TS 36.212 V14.2.0 (Mar. 2017),3rd Generation Partnership Project;Technical Specification Group Radio Access Network;Evolved Universal Terrestrial Radio Access (E-UTRA);Multiplexing and channel coding(Release 14),total 197 pages.

ATandT:"Flexible Transport Block, Codeword and Layer Mapping Concepts for NR",3GPP Draft; R1-1700313,Jan. 16, 2017,total 4 pages.

R1-1701476 Huawei et al.,"WF on QCL Assumptions for NR",3GPP TSG RAN WG1 NR Ad Hoc Meeting,Spokane, USA, Jan. 16-20, 2017,total 2 pages.

Nokia et al:"Multi—b—i-t—feedback for NR HARQ operation",3GPP Draft; R1-1703325,Feb. 12, 2017,total 6 pages.

CATT: "on codeword-to-layer mapping",3GPP Draft; R1-1702069,Feb. 7, 2017,total 4 pages.

Intel Corporation:"on codeword to MIMO layer mapping",3GPP Draft; R1-1611973,Nov. 6, 2016,total 4 pages.

CATT: "Multi-panel/multi-TRP transmission",3GPP Draft; R1-1702071,Feb. 12, 2017,total 6 pages.

NTT Docomo: "Discussion on Codeword-to-Layer Mapping",3GPP Draft; R1-1702851,Feb. 7, 2017,total 4 pages.

LG Electronics: "Discussion on Control Signaling for Uplink Transmission Mode", 3GPP Draft; R1-104770, vol. RAN WG 1 No. Madrid, Spain; Aug. 23, 2010, Aug. 18, 2010, XP050450149, 6 pages.

Fujitsu: ""Preceding for PHICH-triggered SU-MIMO retransmissions"", 3GPP Draft; R1-105679, vol. RAN WG 1 No. Xi"an, China; Oct. 2010, Oct. 14, 2010, XP050489326, 6 pages.

Samsung: "PMI signaling in DCI format for UL MIMO", 3GPP Draft; R1-103034, vol. RAN WG1 No. Montreal, Canada; May 10, 2010, May 4, 2010, XP050420127, 4 pages.

Liu, Shuqun et al., Fractal image coding method based on Fisher classification and space mapping, Journal of Computer Applications, 2013, 33(12), 4 pages.

Chinese Notice of Allowance issued in corresponding Chinese Application No. 202010212127.5, dated Sep. 14, 2021, pp. 1-4.

* cited by examiner

DATA COMMUNICATION METHOD, DEVICE, AND SYSTEM

CROSS-REFERENCE TO RELATED APPLICATIONS

This application is a continuation of International Application No. PCT/CN2018/078926, filed on Mar. 14, 2018, which claims priority to Chinese Patent Application No. 201710184891.4, filed on Mar. 24, 2017. The disclosures of the aforementioned applications are hereby incorporated by reference in their entireties.

TECHNICAL FIELD

This application relates to wireless communications technologies, and in particular, to a communication method, a device, and a system that are related to data communication.

BACKGROUND

A physical layer baseband processing process in a long term evolution (long term evolution, LTE) system may include a process of scrambling, modulation, layer mapping, and precoding, as well as resource mapping and orthogonal frequency division multiplexing (orthogonal frequency division multiplexing, OFDM) signal generation for each physical antenna port. The layer mapping implements mapping from a codeword (codeword) to a layer, and a corresponding layer mapping rule is stipulated for a different quantity of codewords and a different quantity of layers (a quantity of layers) based on a multiple input multiple output (multiple input multiple output, MIMO) scheme. One codeword may correspond to one transport block (transport block, TB).

With the development of communications technologies, new requirements are put forward for data communication performance. Based on this, an existing layer mapping rule, feedback manner, retransmission manner, and the like need to be adjusted, so as to change a data communication manner to optimize the data communication performance.

SUMMARY

This application describes a data communication method, an apparatus, and a system.

According to one aspect, an embodiment of this application provides a data communication method, including: mapping, by a transmit end, each code block group CBG in N CBGs to each layer comprised in a corresponding layer group based on a correspondence between the N CBGs and N layer groups, where each layer group includes at least one layer, and N is a positive integer; and sending, by the transmit end, data to a receive end, where a transport block TB corresponding to the data includes the N CBGs.

According to another aspect, an embodiment of this application provides a data communication method, including: receiving, by a receive end, data sent by a transmit end, where a transport block TB corresponding to the data includes N code block groups (CBGs); and obtaining, by the receive end, the N CBGs from the data based on the correspondence between the N CBGs and N layer groups, where each layer group includes at least one layer, each CBG is mapped to each layer included in a corresponding layer group, and N is a positive integer.

By grouping layers, a mapping relationship between a CBG and a layer group is established, so as to improve data reception quality, through interference cancellation, for transmission among different layer groups, and ensure adaptivity to a CBG-based retransmission feedback, thereby optimizing data communication performance.

With reference to any one of the foregoing aspects, in a possible design, the N layer groups are grouped based on at least one piece of the following information: configured demodulation reference signal DMRS port group information, transmission and reception point TRP or TRP group information included in the transmit end, quasi co-location QCL information among antenna ports corresponding to layers, or identification information of a beam sent by the transmit end.

With reference to any one of the foregoing aspects and any one possible design, in another possible design, N>1, there are at least two CBGs in the N CBGs, and the two CBGs are separately configured with at least one of different modulation schemes, different bit rates, and different precoding matrices.

With reference to any one of the foregoing aspects and at least one of the foregoing possible designs, in another possible design, when a total quantity of layers in the N layer groups is 1 or 2, N=1; or when a total quantity of layers in the N layer groups is 3 or 4, N=1 or N=2.

With reference to any one of the foregoing aspects and at least one of the foregoing possible designs, in another possible design, a quantity of code blocks CBs or a quantity of bits included in each CBG is directly proportional to a quantity of layers included in the corresponding layer group; or a quantity of CBs or a quantity of bits included in each CBG is directly proportional to at least one of a modulation order, a bit rate, or a transmission rate of the corresponding layer group; or a quantity of CBs or a quantity of bits included in each CBG is determined based on at least one of a quantity of allocated resource blocks RBs, a quantity of layers included in a corresponding layer group, and a modulation and coding scheme MCS of each CBG With reference to any one of the foregoing aspects and at least one of the foregoing possible designs, in another possible design, if one of the N CBGs needs to be retransmitted in the N CBGs, the CBG that needs to be retransmitted is mapped to each layer included in a same layer group for initial transmission; or the CBG that needs to be retransmitted is mapped to each layer included in at least one of the N layer groups based on control signaling, where the at least one layer group is indicated by the control signaling; or the CBG that needs to be retransmitted is separately and repeatedly mapped to layers included in M layer groups in the N layer groups in a single-frequency network SFN manner, where the repetition quantity is M, 2≤M≤N, and M is a positive integer; or the CBG that needs to be retransmitted is mapped to each layer included in at least one layer group in the N layer groups based on a swap flag indication.

According to another aspect, an embodiment of the present invention provides a communications device, where the device has a function of implementing behavior of the transmit end in the foregoing method design. The function may be implemented by hardware, and a structure of the transmit end includes a transceiver and a processor. The function may be alternatively implemented by using hardware to execute corresponding software. The hardware or the software includes one or more modules corresponding to the function. The module may be software and/or hardware. The device may be a base station, or may be a terminal.

According to another aspect, an embodiment of the present invention provides another communications device, where the device has a function of implementing behavior of the receive end in the foregoing method design. The function may be implemented by using hardware, or may be implemented by using hardware to execute corresponding software. The hardware or the software includes one or more modules corresponding to the function. The device may be a terminal, or may be a base station.

According to still another aspect, an embodiment of the present invention provides a communications system, where the system includes the transmit end and the receive end described in the foregoing aspects.

According to yet another aspect, an embodiment of the present invention provides a computer storage medium, configured to store computer software instructions used by the foregoing transmit end. The computer storage medium contains a program designed for executing the foregoing aspects.

According to yet another aspect, an embodiment of the present invention provides a computer storage medium, configured to store a computer software instructions used by the foregoing receive end. The computer storage medium contains a program designed for executing the foregoing aspects.

DESCRIPTION OF DRAWINGS

FIG. 1 (b) is a schematic diagram of a layer mapping relationship of another LTE system according to an embodiment of this application;

FIG. 1 (c) is a schematic diagram of a layer mapping relationship of still another LTE system according to an embodiment of this application;

FIG. 1 (d) is a schematic diagram of a layer mapping relationship of yet another LTE system according to an embodiment of this application;

FIG. 2 (b) is a diagram of another application scenario according to an embodiment of this application;

FIG. 2 (c) is a diagram of still another application scenario according to an embodiment of this application;

FIG. 6 (b) is a diagram of a correspondence between another CBG and a layer group according to an embodiment of this application;

FIG. 6 (c) is a diagram of a correspondence between another CBG and a layer group according to an embodiment of this application;

FIG. 6 (d) is a diagram of a correspondence between another CBG and a layer group according to an embodiment of this application;

FIG. 7 (b) is a diagram of a correspondence between another CBG and a layer group according to an embodiment of this application;

FIG. 7 (c) is a diagram of a correspondence between another CBG and a layer group according to an embodiment of this application;

FIG. 7 (d) is a diagram of a correspondence between another CBG and a layer group according to an embodiment of this application;

FIG. 8 (b) is a diagram of a correspondence between another CBG and a layer group according to an embodiment of this application;

FIG. 8 (c) is a diagram of a correspondence between another CBG and a layer group according to an embodiment of this application;

FIG. 8 (d) is a diagram of a correspondence between another CBG and a layer group according to an embodiment of this application;

FIG. 9 (b) is a diagram of a correspondence between another CBG and a layer group according to an embodiment of this application;

FIG. 9 (c) is a diagram of a correspondence between another CBG and a layer group according to an embodiment of this application;

FIG. 9 (d) is a diagram of a correspondence between another CBG and a layer group according to an embodiment of this application;

FIG. 11 (b) is a schematic diagram of another retransmission manner based on a swap flag indication according to an embodiment of this application.

DESCRIPTION OF EMBODIMENTS

In the existing LTE technology, a physical layer baseband processing process may be specifically as follows: obtain a to-be-transmitted TB from a media access control (media access control, MAC) layer, where a TB size (TB Size, TBS) is determined by a quantity of RBs, a quantity of layers, and a modulation and coding scheme (modulation and coding scheme, MCS) allocated by a base station (refer to Section 7.1.7 and Section 8.6 in 3rd Generation Partnership Project (the 3rd generation partnership project, 3GPP) Technical Specification (technical specification, TS) 36.213 Version 14.1.0 (v14.1.0)); add cyclic redundancy check (cyclic redundancy check, CRC) to the TB; perform a segmentation operation on the TB based on the TBS, for example, if the TBS is greater than 6144 bits, divide the TB into a plurality of code blocks (code block, CB) with the same size that is less than 6144 bits, and then add CRC to each CB (refer to Section 5.1.2 in 3GPP TS 36.212 v14.1.1); and perform encoding and rate matching for each CB, and then send the CB after performing the following operations: scrambling, modulation, layer mapping, and precoding, as well as resource mapping and orthogonal frequency division multiplexing (orthogonal frequency division multiplexing, OFDM) signal generation for each physical antenna port.

Figure 1:
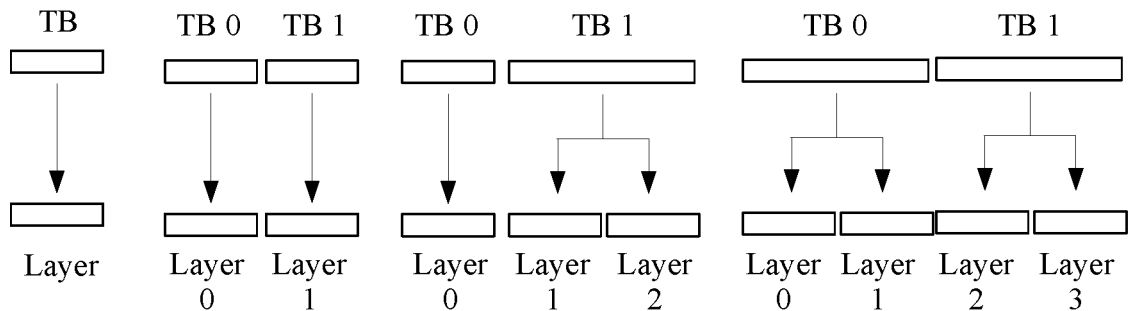
FIG. 1 (a) is a schematic diagram of a layer mapping relationship of an LTE system according to an embodiment of this application.

One or two TBs may be scheduled at a time during data scheduling. For the transmission, a MIMO scheme may be used, and correspondingly there is a layer mapping process. FIG. 1 (a) to FIG. 1 (d) are schematic diagrams of several possible layer mapping relationships in an existing LTE system. For example, in FIG. 1 (a), one TB is scheduled at a time during data scheduling, a single-layer transmission manner is used, and then one TB is mapped to this single layer. For another example, as shown in FIG. 1 (c), two TBs are scheduled at a time during data scheduling, a 3-layer transmission manner is used, and then TB 0 is mapped to layer 0, and TB1 is mapped to layer 1 and layer 2.

Further, regarding a layer mapping rule, in the LTE system, after the quantity of TBs (1 or 2) for the current data scheduling is determined, and the quantity of layers is determined based on a quality of current channels, a mapping relationship between a TB (or codeword) and a layer may be determined based on Table 5.3.2A.2-1 in Section 5.3.2A.2 and Table 6.3.3.2-1 in Section 6.3.3.2 in 3GPP TS 36.211 v14.1.0.

For LTE MIMO, there are following transmission manners:

1. Single-antenna port transmission: There is only one TB (or codeword), only one layer is used, and the TB (or codeword) is directly mapped to the layer;

2. Transmission diversity: There is only one TB (or codeword), and two or four antenna ports are used for transmission, which are respectively corresponding to two or four layers. All the modulation symbols of the TB (or codeword) are distributed one by one at different layers in a polling manner. Each bit of a plurality of CBs obtained by dividing the TB (or codeword) is mapped to a resource block (resource block, RB) in the following order: space domain, frequency domain, and time domain.

3. Space division multiplexing: There is one or two TBs (or codewords), which may be mapped to layers 1 to 8. For a specific mapping rule, refer to Table 6.3.3.2-1.

According to the discussion result of new radio (new radio, NR), the following scenarios may be supported in a future wireless communications system:

For layers 1 to 4, 1-TB (or codeword) transmission is supported; and for layers 5 to 8, 2-TB (or codeword) transmission is supported.

In addition, a CBG concept is introduced (one CBG may include at least one CB). Hybrid automatic repeat request (hybrid automatic repeat request, HARQ) is performed based on a CBG instead of performing a HARQ feedback based on a TB in the LTE system, thereby improving transmission efficiency.

Based on the foregoing mechanism that is different from the LTE system, it is necessary to redesign the layer mapping rule, so as to optimize transmission performance, and ensure that a current channel environment matches a transmission scenario.

In one technical solution provided by this application, a mapping relationship between a CBG and a layer group is established by grouping the layers, so as to improve data reception quality, through interference cancellation, for transmission among different layer groups, and ensure adaptivity to a CBG-based retransmission feedback, thereby optimizing transmission performance of the entire communications system.

The following describes a system operating environment of this application. A wireless communications system described in this application may use various radio access technologies, for example, a system that uses an access technology such as code division multiple access (code division multiple access, CDMA), frequency division multiple access (frequency division multiple access, FDMA), time division multiple access (time division multiple access, TDMA), orthogonal frequency division multiple access (frequency division multiple access, OFDMA), and single carrier frequency division multiple access (single carrier-frequency division multiple access, SC-FDMA). The technology is further applicable to a subsequent evolved system, for example, a fifth generation 5G system (which may also be referred to as a new radio (new radio, NR) system).

Figure 2:
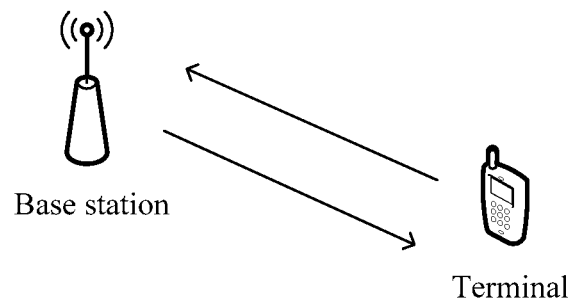
FIG. 2 (a) is a diagram of an application scenario according to an embodiment of this application.
Figure 2:
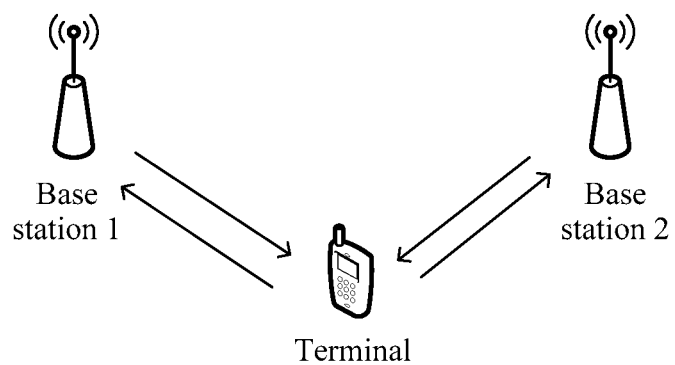
Figure 2:
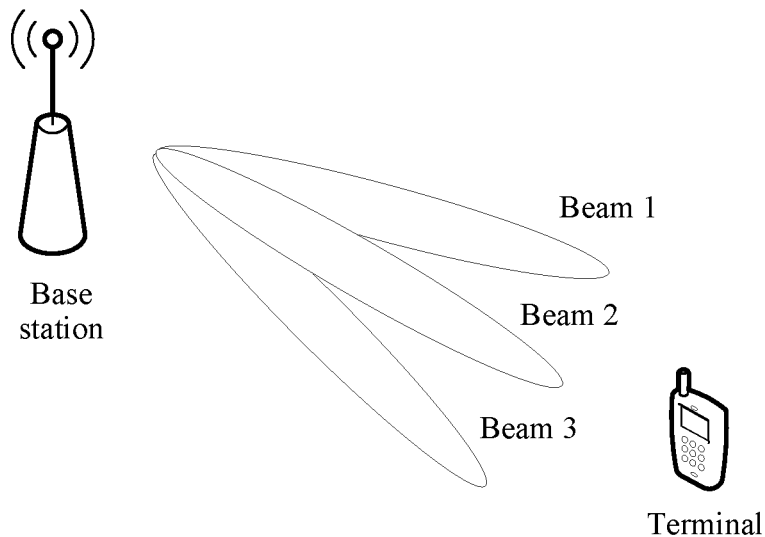

FIG. 2 (a), FIG. 2 (b), and FIG. 2 (c) show some application scenarios of a communications system in which a technical solution of this application is available. However, this application is not limited to these application scenarios.

In FIG. 2 (a), a base station and a terminal may transmit data or signaling by using a radio interface, including uplink transmission and downlink transmission. Both the base station and the terminal have a plurality of antenna ports, which may correspond to a plurality of layers, and MIMO transmission is supported.

FIG. 2 (b) shows a scenario of coordinated transmission, including two base stations and one terminal. By using at least one physical downlink control channel (PDCCH), the two base stations may be scheduled to simultaneously transmit data with one terminal. Generally, based on a result of a channel measurement, the antenna ports corresponding to different base stations may be in quasi co-location (QCL). In other words, there is a great difference among large-scale parameters corresponding to the antenna ports. In addition, in this scenario, the quantity of base stations is not limited to two, and may be greater than or equal to 2.

FIG. 2 (c) shows a scenario of MIMO transmission. A base station or a terminal may use a plurality of beams (an analog beam, a digital beam, or a hybrid beam) for data communication. In an example shown in FIG. 2 (c), the base station uses a plurality of beams to send data to the terminal. Each beam may correspond to a beam identity (beam identity, beam ID), and each beam corresponds to at least one antenna port. In some embodiments, the plurality of beams may be scanned by using an analog beam or a hybrid beam.

A person of ordinary skill in the art may understand that in this application, there is generally a correspondence between an antenna port and a layer, and the correspondence may be established by using a precoding matrix.

The terminal in this application may be a device providing voice or data connectivity for a user, and may include a wireless terminal and a wired terminal. The wireless terminal may be a handheld device with a radio connection function, or another processing device connected to a radio modem, and may be a mobile terminal that communicates with one or more core networks by using a radio access network. For example, the wireless terminal may be a mobile phone, a computer, a tablet computer, a personal digital assistant (personal digital assistant, PDA), a mobile Internet device (mobile internet device, MID), a wearable device, an electronic reader (e-book reader), and the like. For another example, the wireless terminal may be a portable, pocket-sized, handheld, computer built-in, or in-vehicle mobile device. For another example, the wireless terminal may be a mobile station (mobile station) or an access point (access point). In addition, user equipment (user equipment, UE) is a type of terminal, and is a title used in an LTE system. For the convenience of description, the devices described above are collectively referred to as terminals in subsequent descriptions of this application. The base station in this application is an apparatus deployed in a radio access network (radio access network, RAN) and configured to provide a radio communication function for the terminal. The base station may include a macro base station, a micro base station, a relay station, an access point, a base station controller, a transmission and reception point (transmission and receiving point, TRP), and the like, in various forms. In systems using different radio access technologies, a specific name of the base station may vary. For example, in an LTE network, the base station is referred to as an evolved NodeB (evolved NodeB, eNB); and in a subsequent evolved system, the base station may also be referred to as a new radio NodeB (new radio NodeB, gNB).

The following describes terms used in this application.

The layer in this application may also be referred to as a transport layer or a rank (rank). Each layer may correspond to a valid data stream, and is used to carry a modulated symbol. Further, a concept of mapping a CBG to a layer may be understood as that a modulation symbol formed after a bit included in the CBG is modulated is mapped to a resource of the layer.

A transmit end in this application refers to a sender of data. For example, in downlink transmission, the transmit end may be a base station; and particularly, in a coordinated transmission scenario, the transmit end may be one or more base stations. For another example, in uplink transmission, the transmit end may be a terminal.

A receive end in this application refers to a receiver of data. For example, in uplink transmission, the receive end may be a base station; and particularly, in a coordinated transmission scenario, the receive end may be one or more base stations. For another example, in downlink transmission, the receive end may be a terminal.

A relationship between the data and the TB in this application is that the data is obtained after the foregoing baseband processing is performed on the TB, and then the data is sent. In other words, the data and the TB correspond to each other.

Figure 3:
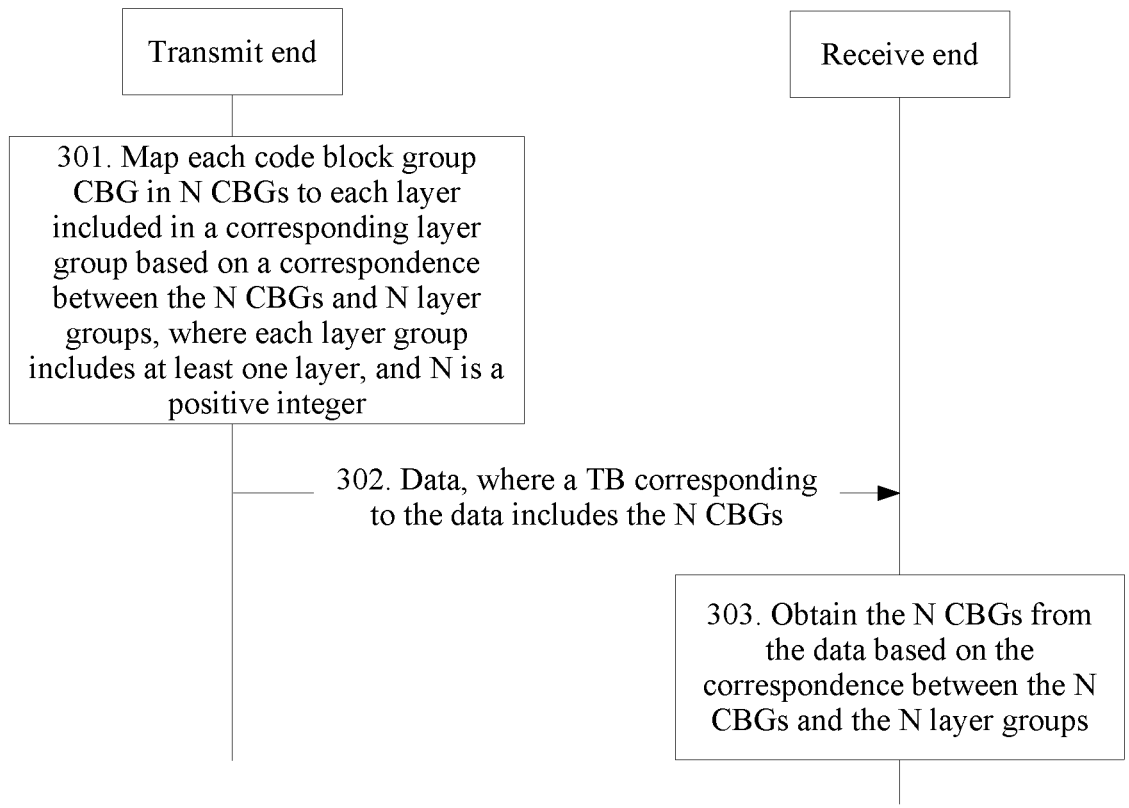
FIG. 3 is a schematic structural diagram of a transmit end according to an embodiment of this application.
Figure 4:
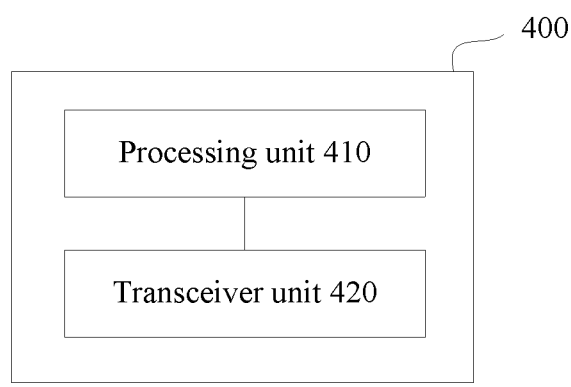
FIG. 4 is a schematic structural diagram of a receive end according to an embodiment of this application.
Figure 5:
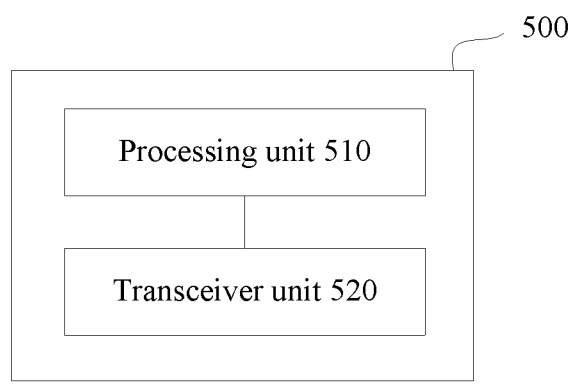
FIG. 5 is a flowchart of a data communication method according to an embodiment of this application.

Further, the transmit end described above may be a transmit end 300 shown in FIG. 3, and is configured to perform method steps related to the transmit end in various embodiments of this application. As shown in FIG. 3, the transmit end 300 includes a processing unit 310 and a transceiver unit 320. The receive end described above may be a receive end 400 shown in FIG. 4, and is configured to perform method steps related to the receive end in various embodiments of this application. As shown in FIG. 4, the receive end 400 includes a processing unit 410 and a transceiver unit 420. It should be noted that an operation performed by the processing unit 310 or the transceiver unit 320 may be considered as an operation performed by the transmit end 300, and an operation performed by the processing unit 410 or the transceiver unit 420 may be considered as an operation performed by the receive end 400. The processing unit 410 in the receive end 400 may be implemented by a processor of the receive end 400, and the transceiver unit 420 may be implemented by a transceiver in the receive end 400. The processing unit 310 in the transmit end 300 may be implemented by a processor in the transmit end 300, and the transceiver unit 320 may be implemented by a transceiver in the transmit end 300. The transmit end 300 may implement method steps of transmit ends in all the following embodiments; and the receive end 400 may implement method steps of receive ends in all the following embodiments.

Embodiment 1

FIG. 3 is a flowchart of a data communication method. As shown in FIG. 3, in part 301, a transmit end maps, each code block group (CBG) in N CBGs to each layer included in a corresponding layer group based on a correspondence between the N CBGs and N layer groups, where each layer group includes at least one layer, and N is a positive integer. In part 302, the transmit end sends data to a receive end, where a transport block TB corresponding to the data includes the N CBGs; and the receive end receives the data sent by the transmit end. In part 305, the receive end obtains the N CBGs from the data based on the correspondence between the N CBGs and the N layer groups.

This solution may be applied to a MIMO scenario, disclosing a solution of mapping a CBG to a layer based on a correspondence between the CBG and a layer group.

The transmit end maps, based on the correspondence between N CBGs and the N layer groups, the N CBGs that have been scrambled and modulated (the processing is optional) to a layer included in a corresponding layer group. In some embodiments, the transmit end sends corresponding data to the receive end after performing the foregoing processing, such as precoding, resource mapping, and signal generation. The receive end first receives the data, and then performs a series of inverse operations corresponding to operations performed by the transmit end, including obtaining, through de-mapping, the N CBGs from the data based on the correspondence between the N CBGs and the N layer groups; in other words, reading content in the data. This disclosure focuses on operations of layer mapping, including the correspondence between the N CBGs and the N layer groups. The following gives a detailed description.

In this disclosure, a TB corresponding to the data includes N CBGs, and layers required for transmission of the data are grouped into N layer groups, where each layer group includes one or more layers, and N is a positive integer.

Figure 6:
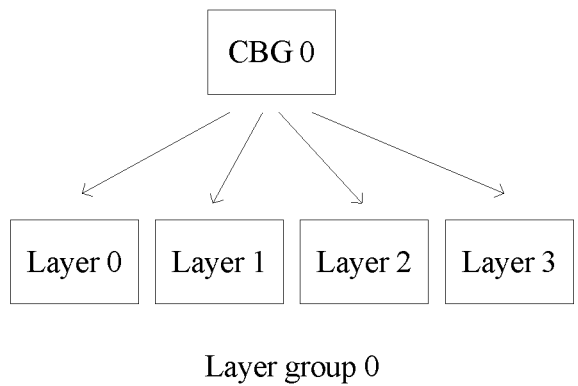
FIG. 6 (a) is a diagram of a correspondence between a CBG and a layer group according to an embodiment of this application.
Figure 6:
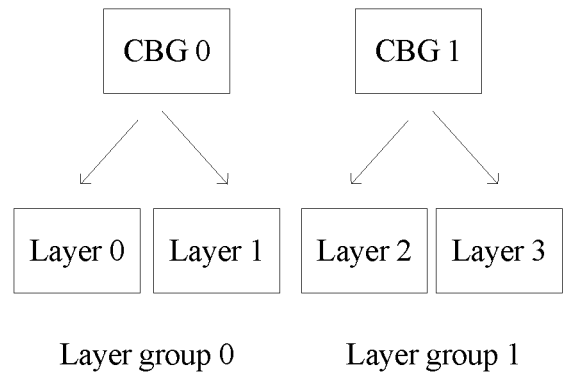
Figure 6:
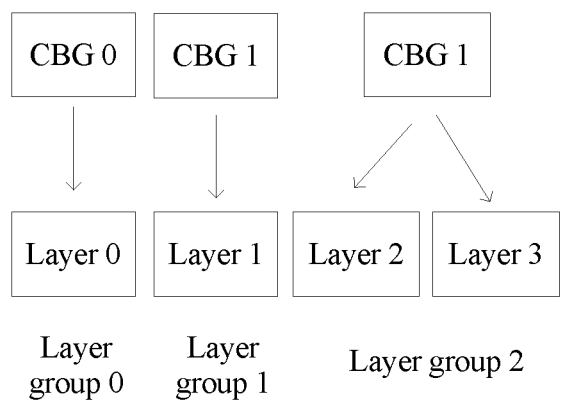
Figure 6:
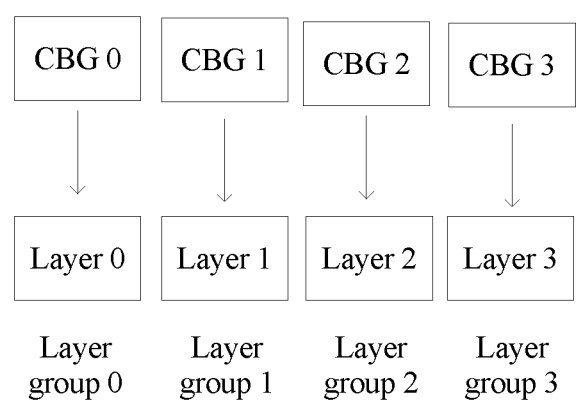

The N CBGs correspond to the N layer groups, and each CBG is mapped to each layer included in a corresponding layer group. This feature may be understood as that each CBG corresponds to one layer group in the N layer groups, and is mapped to each layer included in the layer group, and each CBG corresponds to a different layer group. It may be alternatively understood as that each CBG cannot correspond to more than one layer group. For example, it is assumed that four layers are required for the data communication: layer 0, layer 1, layer 2, and layer 3. As shown in FIG. 6 (a), layer 0, layer 1, layer 2 and layer 3 are grouped into a same layer group, and the TB includes one CBG: CBG 0; then as shown in FIG. 6 (a), CBG 0 is mapped to the four layers. Alternatively, as shown in FIG. 6 (b), layer 0 and layer 1 are grouped into layer group 0, layer 2 and layer 3 are grouped into layer group 1, and the TB includes two CBGs: CBG 0 and CBG 1; then as shown in FIG. 6 (b), CBG 0 is mapped to layer 0 and layer 1 (corresponding to layer group 0), and CBG 1 is mapped to layer 2 and layer 3 (corresponding to layer group 1). Alternatively, as shown in FIG. 6 (c), layer 0 is grouped into layer group 0, layer 1 is grouped into layer group 1, layer 2 and layer 3 are grouped into layer group 2, and the TB includes three CBGs: CBG 0, CBG 1, and CBG 2; then as shown in FIG. 6 (c), CBG 0 is mapped to layer 0 (corresponding to layer group 0), CBG 1 is mapped to layer 1 (corresponding to layer group 1), and CBG 2 is mapped to layer 2 and layer 3 (corresponding to layer group 2). Alternatively, as shown in FIG. 6 (d), layer 0 is grouped into layer group 0, layer 1 is grouped into layer group 1, layer 2 is grouped into layer group 2, layer 3 is grouped into layer group 3, and the TB includes four CBGs: CBG 0, CBG 1, CBG 2 and CBG 3; then as shown in FIG. 6 (d), CBG 0 is mapped to layer 0 (corresponding to layer group 0), CBG 1 is mapped to layer 1 (corresponding to layer group 1), CBG 2 is mapped to layer 2 (corresponding to layer group 2), and CBG 3 is mapped to layer 3 (corresponding to layer group 3).

In the foregoing example, there are only four layers. In practice, a layer required for the data communication may be flexibly determined, and a quantity of layers may be determined based on a result of a channel measurement. Generally, the quantity of layers is defined to be equal to that of ranks.

Refer to the following implementation 1 and corresponding accompanying drawings, so as to have a clearer understanding of the correspondence.

Figure 7:
FIG. 7 (a) is a diagram of a correspondence between a CBG and a layer group according to an embodiment of this application.
Figure 7:
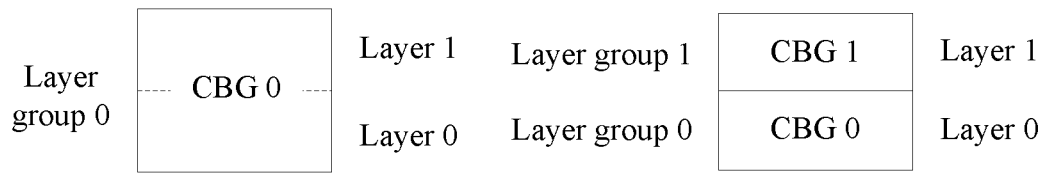
Figure 7:
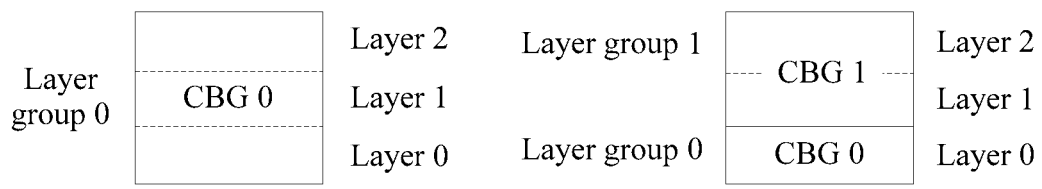
Figure 7:
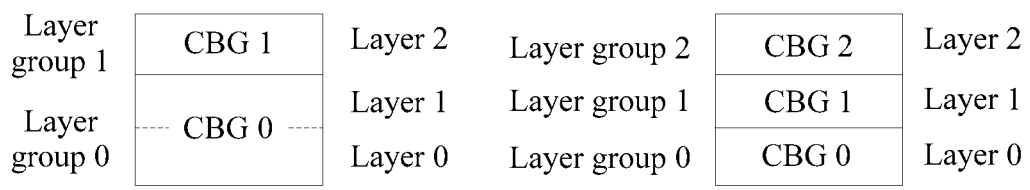
Figure 7:
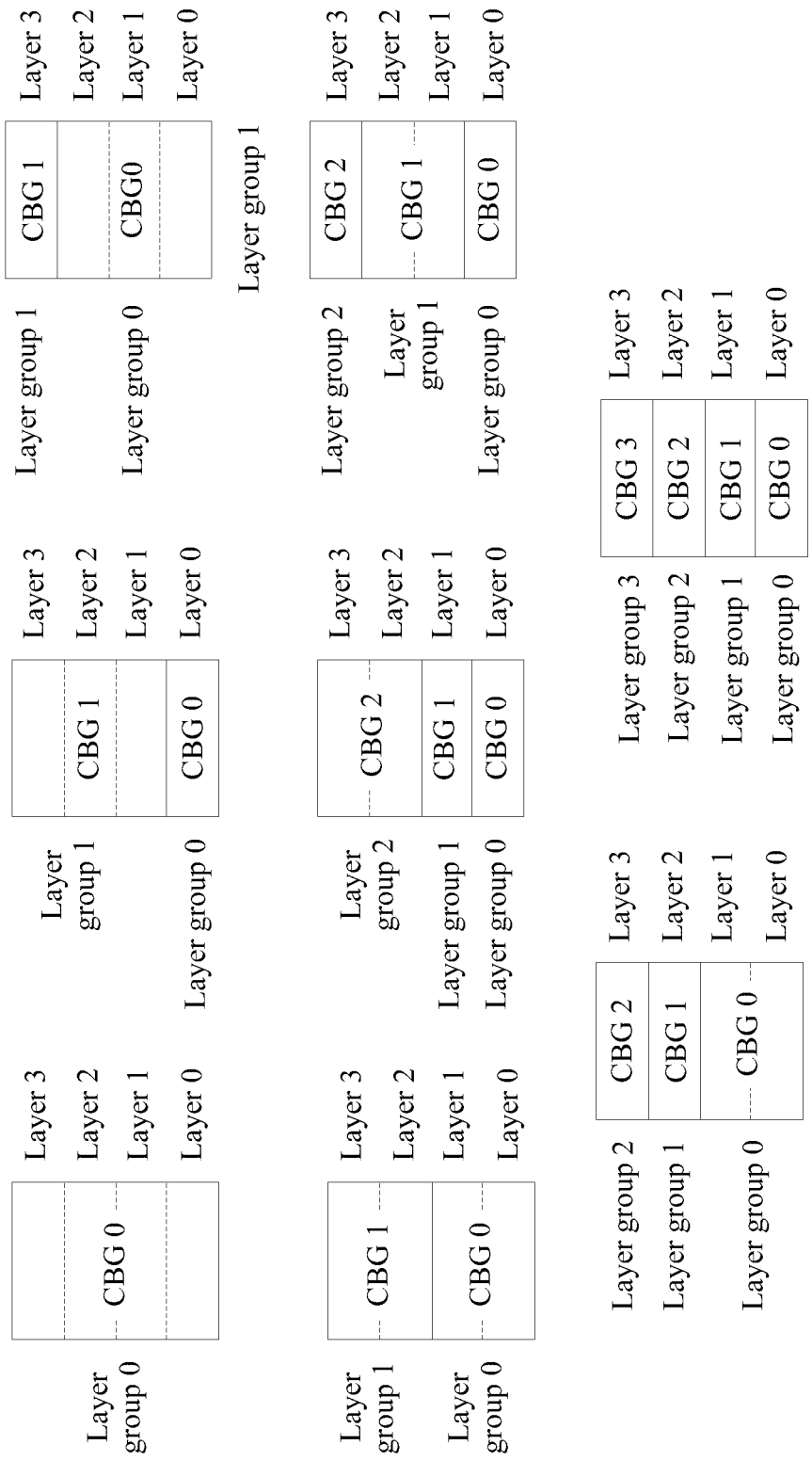

As shown in FIG. 7 (a), a quantity of layers for the data communication is 1, N=1, the layer may be grouped into one group: layer 0, and a quantity of CBGs is 1. A specific correspondence is: N=1, and CBG 0 corresponds to layer group 0 that includes layer 0. It should be noted that CBG 0 corresponds to layer group 0 that includes layer 0 may also be understood as that CBG 0 corresponds to layer group 0, and is mapped to layer 0 included in layer group 0. Some similar descriptions below may also be understood similarly, and details are not described again.

As shown in FIG. 7 (b), a quantity of layers for the data communication is 2, N=1 or N=2, the layers may be grouped into one or two groups, and a quantity of CBGs is 1 or 2. A specific correspondence is: N=1, and CBG 0 corresponds to layer group 0 that includes layer 0 and layer 1; or N=2, CBG 0 corresponds to layer group 0 that includes layer 0, and CBG 1 is mapped to layer group 1 that includes layer 1;

As shown in FIG. 7 (c), a quantity of layers for the data communication is 3, N=1, N=2, or N=3, the layers may be grouped into one, two, or three groups, and a quantity of CBGs is 1, 2, or 3. A specific correspondence is as follows: N=1, and CBG 0 corresponds to layer group 0 that includes layer 0, layer 1, and layer 3; N=2, CBG 0 corresponds to layer group 0 that includes layer 0, and CBG 1 corresponds to layer group 1 that includes layer 1 and layer 2; N=2, CBG 0 corresponds to layer group 0 that includes layer 0 and layer 1, and CBG 1 corresponds to layer group 1 that includes layer 2; or N=3, CBG 0 corresponds to layer group 0 that includes layer 0, CBG 1 corresponds to layer group 1 that includes layer 1, and CBG 2 corresponds to layer group 2 that includes layer 2.

As shown in FIG. 7 (d), a quantity of layers for the data communication is 4, N=1, N=2, N=3, or N=4, the layers may be grouped into one, two, three, or four groups, and a quantity of CBGs is 1, 2, 3 or 4. A specific correspondence is as follows: N=1, and CBG 0 corresponds to layer group 0 that includes layer 0, layer 1, layer 2, and layer 3; N=2, CBG 0 corresponds to layer group 0 that includes layer 0, and CBG 1 corresponds to layer group 1 that includes layer 1, layer 2, and layer 3; N=2, CBG 0 corresponds to layer group 0 that includes layer 0, layer 1, and layer 2, and CBG 1 corresponds to layer group 1 that includes layer 3. N=2, CBG 0 corresponds to layer group 0 that includes layer 0 and layer 1, and CBG 1 corresponds to layer group 1 that includes layer 2 and layer 3; N=3, CBG 0 corresponds to layer group 0 that includes layer 0, CBG 1 corresponds to layer group 1 that includes layer 1, and CBG 2 corresponds to layer group 2 that includes layer 2 and layer 3; N=3, CBG 0 corresponds to layer group 0 that includes layer 0, CBG 1 corresponds to layer group 1 that includes layer 1 and layer 2, and CBG 2 corresponds to layer group 2 that includes layer 3; N=3, CBG 0 corresponds to layer group 0 that includes layer 0 and layer 1, CBG 1 corresponds to layer group 1 that includes layer 2, and CBG 2 corresponds to layer group 2 that includes layer 3; N=4, CBG 0 corresponds to layer group 0 that includes layer 0, CBG 1 corresponds to layer group 1 that includes layer 1, CBG 2 corresponds to layer group 2 that includes layer 2, and CBG 3 corresponds to layer group 3 that includes layer 3.

In some embodiments, for reducing a possible mapping relationship and simplify a mapping rule, a limitation may be further introduced to form different implementations.

The limitation is as follows: A layer group is numbered, so that a quantity of layers included in a layer group with a smaller number is less than or equal to a quantity of layers included in a layer group with a larger number. A corresponding implementation 2 is described below.

Figure 8:
FIG. 8 (a) is a diagram of a correspondence between a CBG and a layer group according to an embodiment of this application.
Figure 8:
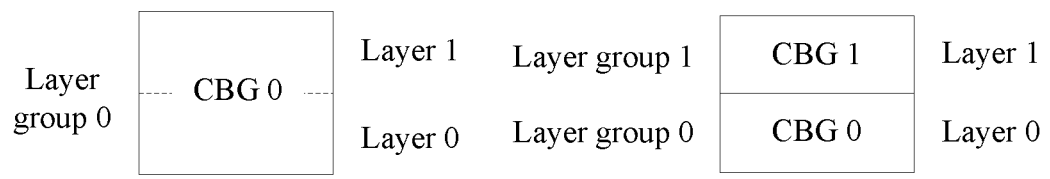
Figure 8:
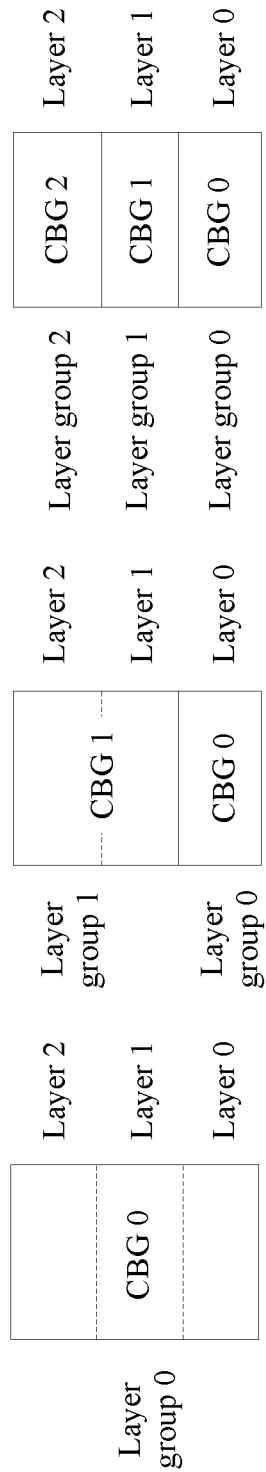
Figure 8:
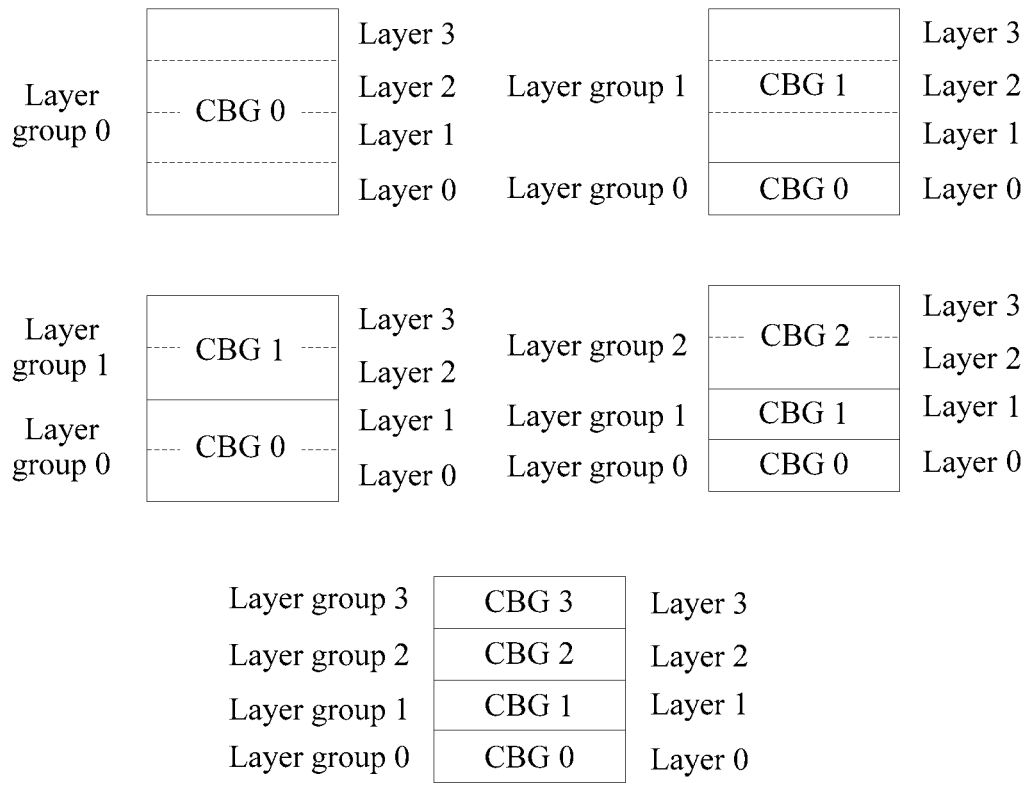

As shown in FIG. 8 (a), a quantity of layers for data communication is 1, N=1, the layer may be grouped into one group, and a quantity of CBGs is 1; and because there is only one layer group 0, a technical solution added with the limitation is the same as that in implementation 1.

As shown in FIG. 8 (b), a quantity of layers for data communication is 2, N=1 or N=2, the layers may be grouped into one or two groups, and a quantity of CBGs is 1 or 2; and a technical solution added with the limitation is the same as that in implementation 1.

As shown in FIG. 8 (c), a quantity of layers for the data communication is 3, N=1, N=2, or N=3, the layers may be grouped into one, two, or three groups, and a quantity of CBGs is 1, 2, or 3. When N=1 or N=3, and a technical solution added with the limitation is the same as that in implementation 1. In particular, when N=2, it is assumed that a layer group corresponding to CBG 0 is numbered 0, and a layer group corresponding to CBG 1 is numbered 1, because it needs to ensure that "a quantity of layers included in a layer group with a smaller number is less than or equal to a quantity of layers included in a layer group with a larger number", a quantity of correspondence manners is one less than a quantity of correspondence manners shown in FIG. 7 (c). In this case, CBG 0 corresponds to layer group 0 that includes layer 0, and CBG 1 corresponds to layer group 1 that includes layer 1 and layer 2.

As shown in FIG. 8 (d), a quantity of layers for data communication is 4, N=1 N=2, N=3, or N=4, and may be grouped into one, two, three, or four groups, and a quantity of CBGs is 1, 2, 3 or 4; and when N=1 or N=4, a technical solution added with the limitation is the same as that in implementation 1. When N=2, it is assumed that a layer group to which CBG 0 is mapped is numbered 0, and a layer group to which CBG 1 is mapped is numbered 1, because it needs to ensure that "a quantity of layers included in a layer group with a smaller number is less than or equal to a quantity of layers included in a layer group with a larger number", a quantity of correspondence manners is one less than a quantity of correspondence manners shown in FIG. 7 (d). In this case, CBG 0 corresponds to layer group 0 that includes layer 0, CBG 1 corresponds to layer group 1 that includes layer 1 and layer 2; or CBG 0 corresponds to layer group 0 that includes layer 0 and layer 1, and CBG 1 corresponds to layer group 1 that includes layer 2 and layer 3. When N=3, it is assumed that a layer group corresponding to CBG 0 is numbered 0, a layer group corresponding to CBG 1 is numbered 1, and a layer group corresponding to CBG 2 is numbered 2, because it needs to ensure that "a quantity of layers included in a layer group with a smaller number is less than or equal to a quantity of layers included in a layer group with a larger number", a quantity of correspondence manners is one less than a quantity of correspondence manners shown in FIG. 7 (d). In this case, CBG 0 corresponds to layer group 0 that includes layer 0, CBG 1 corresponds to layer group 1 that includes layer 1, and CBG 2 corresponds to layer group 1 that includes layer 2 and layer 3.

Alternatively, a limitation is as follows: When a quantity of layers for the data communication, that is, a total quantity of layers in the N layer groups is 1 or 2, N=1; or when a quantity of layers for the data communication is 3 or 4, N=1 or N=2. When the quantity of layers for the data communication is 2, the two layers are directly grouped into one group, because in this case, different layers are separately decoded in an interference cancellation manner. In other words, a data receiving manner by using an advanced receiver does not bring an obvious gain. A corresponding implementation 3 is described below.

Figure 9:
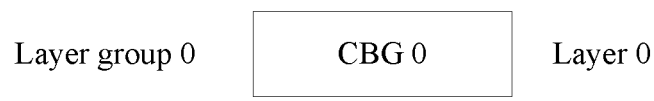
FIG. 9 (a) is a diagram of a correspondence between a CBG and a layer group according to an embodiment of this application.
Figure 9:
Figure 9:
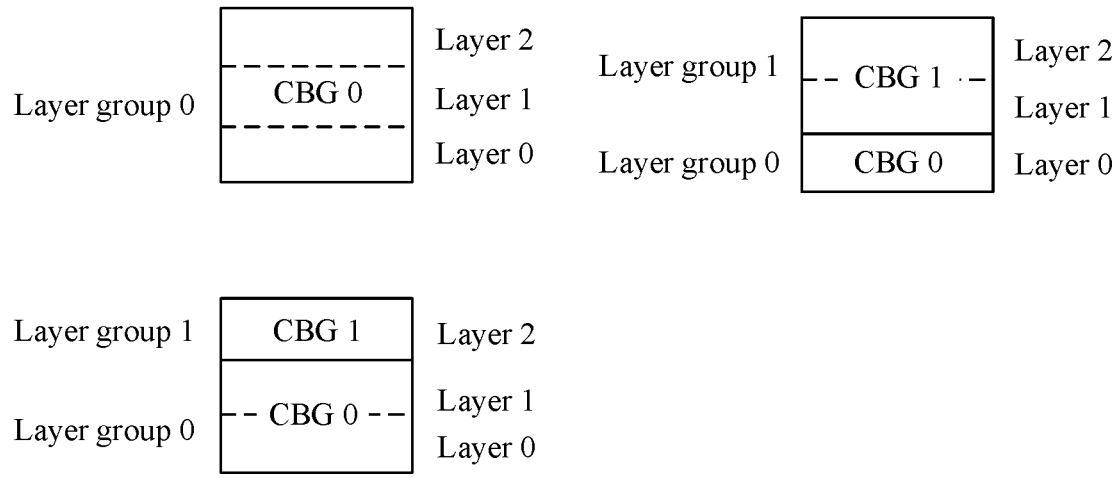
Figure 9:
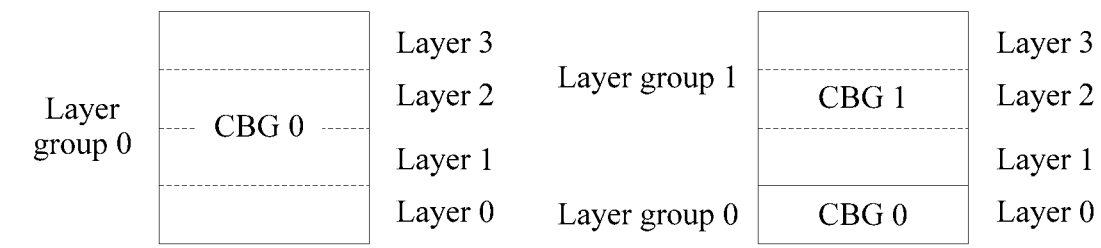
Figure 9:
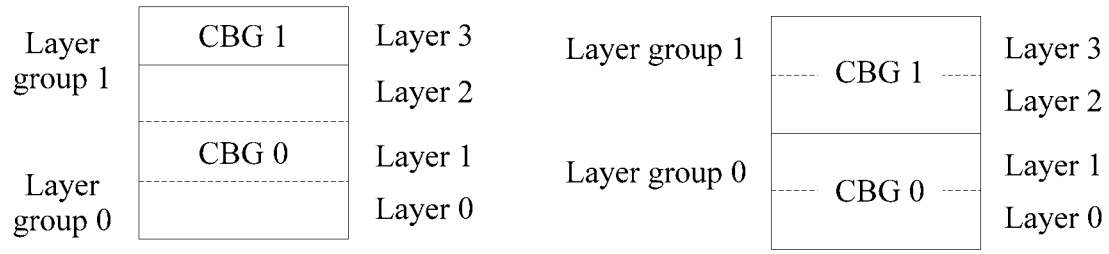

As shown in FIG. 9 (a), a quantity of layers for data communication is 1, N=1, the layer may be grouped into one group, and a quantity of CBGs is 1; and because there is only one layer group, a technical solution added with the limitation is the same as that in implementation 1.

As shown in FIG. 9 (b), a quantity of layers for the data communication is 2, because of the limitation that "when a quantity of layers for the data communication is 1 or 2, N=1", N=1, and a quantity of CBGs is 1, there is only one possibility of mapping, that is, CBG 0 corresponds to a layer group that includes layer 0 and layer 1.

As shown in FIG. 9 (c), a quantity of layers for the data communication is 3, because of the limitation that "when the quantity of layers for the data communication is 3 or 4, N=1 or N=2", N=1 or N=2, the layers may be grouped into one or two groups, and a quantity of CBGs is 1 or 2. A mapping manner is as follows: N=1, CBG 0 corresponds to a layer group that includes layer 0, layer 1, and layer 2; N=2, CBG 0 corresponds to a layer group that includes layer 0, and CBG 1 corresponds to a layer group that includes layer 1 and layer 2; or N=2, CBG 0 corresponds to a layer group that includes layer 0 and layer 1, and CBG 1 corresponds to a layer group that includes layer 2.

As shown in FIG. 9 (d), a quantity of layers for the data communication is 4, because of the limitation that "when the quantity of layers for the data communication is 3 or 4, N=1 or N=2", N=1 or N=2, the layers may be grouped into one or two groups, and a quantity of CBGs is 1 or 2. A mapping manner is as follows: N=1, CBG 0 corresponds to a layer group that includes layers 0 to 4; or N=2, CBG 0 corresponds to a layer group that includes layer 0, and CBG 1 corresponds to a layer group that includes layers 0 to 3; or N=2, CBG 0 corresponds to a layer group that includes layers 0 to 2, and CBG 1 corresponds to a layer group that includes layer 3; or N=2, CBG 0 corresponds to a layer group that includes layer 0 and layer 1, and CBG 1 corresponds to a layer group that includes layer 1 and layer 2.

Alternatively, the limitation is as follows: When N≤2, that is, the quantity of layers ≤4, layers are only grouped into one or two groups, and a corresponding quantity of CBGs is 1 or 2. An advantage is that when a HARQ feedback is performed based on the CBG only two bits are needed, thereby reducing feedback overheads.

A difference between the corresponding implementation 3 and the implementation 2 lies in that when the quantity of layers for the data communication is 2, one more mapping manner is available, that is, N=2, CBG 0 corresponds to a layer group that includes layer 0, and CBG 1 corresponds to a layer group that includes layer 1. Other aspects of the two implementations are the same.

It should be noted that in the foregoing several implementations, the quantity of layers may be further increased. For example, when the data corresponds to 2 TBs, there may also be layers 5 to 8. Generally, one TB may be distributed at a maximum of four layers for transmission. If the data corresponds to two TBs, for the other TB, only all the possible division and mapping manners of the first TB at layers 1 to 4 need to be repeated at layers 5 to 8. Details are not described herein again.

In some embodiments, if a quantity of layers is greater than 4 and data scheduled corresponds to two TBs, each TB may include only one CBG; so as to reduce HARQ feedback overheads.

In the foregoing embodiments, if a quantity of layers included in each layer group is greater than or equal to 2, numbers of the layers are consecutive. In practice, if the quantity of layers included in each layer group is greater than or equal to 2, numbers of the layers may be inconsecutive. For example, a quantity of layers for the data communication is 3, N=2, layers included in one layer group may be layer 0 and layer 2. Whether the numbers of the layers are consecutive may be determined based on channel transmission quality of an antenna port corresponding to a layer.

Figure 10:
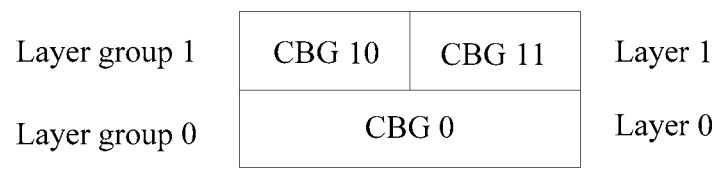
FIG. 10 is a schematic diagram of a CBG division according to an embodiment of this application.

In addition, considering that a layer group may carry a large data volume, for example, carry more than 100,000 bits, In some embodiments, with reference to any one of the foregoing implementations, an original CBG (CBG 0, CBG 1, CBG 2, or CBG 3) may be further divided, and the division may be performed in time domain or frequency domain. For example, as shown in FIG. 10, a quantity of layers for the data communication is 2, N=2, CBG 0 corresponds to a layer group that includes layer 0, and CBG 1 corresponds to a layer group that includes layer 1, and CBG 1 may be further divided into CBG 10 and CBG 11; and certainly, CBG 1 may alternatively be divided into more CBGs. In this case, it may be understood that one CBG cannot correspond to more than one layer (that is, one CBG cannot be mapped to layers included in more than one layer group). With this example, a person skilled in the art may understand and implement a similar division manner. Details are not described in this application.

Embodiment 2

Based on Embodiment 1, this embodiment includes all the technical solutions in Embodiment 1. In this embodiment, several foundations for obtaining layer groups in Embodiment 1 are described.

Implementation 1: Various possible correspondences between a transmit end and a receive end, that is, a base station and a terminal in Embodiment 1, may be pre-specified, for example, a mapping relationship table may be specified in a protocol. In this manner, no notification signaling overhead is needed.

Implementation 2: A base station may indicate various possible correspondences used in the terminal embodiment 1 by using signaling.

Further, layers may be grouped based on some information.

In some embodiments, layers may be grouped based on QCL parameter information of an antenna port or a demodulation reference signal (demodulation reference signal, DMRS) port corresponding to a layer. Generally, each layer corresponds to a specific antenna port, and if a large-scale feature corresponding to a channel through which an antenna port passes can be obtained by using the large-scale feature corresponding to the channel through which another antenna port passes, it is considered that the two antenna ports satisfy a QCL requirement. The large-scale feature includes an average delay, average power, Doppler spread, a Doppler shift, and space domain information, for example, an angle of arrival, or receive antenna correlation. In case of QCL between two antenna ports, channel quality may be similar (or the large-scale parameters are similar) when the antenna ports are used to transmit data. In case that antenna ports corresponding to layers are QCL, the antenna ports are grouped into one layer group; otherwise, the antenna ports cannot be located in a same layer group. For example, the layers for data communication are layer 1, layer 2, layer 3, and layer 4, which are respectively corresponding to antenna port 1, antenna port 2, antenna port 3, and antenna port 4. In case of QCL between antenna port 1 and antenna port 2, non-QCL between antenna port 3 and other ports, and non-QCL between antenna port 4 and other ports, layer 1 and layer 2 are grouped into one group, layer 3 is grouped into one group, and layer 4 is grouped into one group, that is, the layers are grouped into three groups (N=3). In this way, when data communication is performed, the channel quality is similar when data communication is performed by the antenna ports corresponding to the layers in a same layer group, because each CBG is correspondingly mapped into one of the groups, the receive end may demodulate and decode each CBG separately. In this case, an advanced receiver can be used for joint decoding, to eliminate interference caused by the CBG transmitted on a channel of poor quality on the CBG transmitted on a channel of good quality, that is, the interference cancellation technology may be used to receive different CBGs, thereby improving correctness of data communication. In addition, this method is advantageous for an independent HARQ feedback and a subsequent retransmission based on a CBG In this case, the base station may determine, based on current scheduling, a quantity of layers and QCL grouping status of corresponding antenna ports needed for data communication.

In some embodiments, the layers may be grouped based on DMRS port grouping status. That is, if the DMRS ports corresponding to the layers for data communication belong to a same DMRS port group, the DMRS ports are grouped into one layer group; otherwise, the DMRS ports belong to different layer groups. Because the ports in the same DMRS port group are in QCL, and the ports in different DMRS port groups are not in QCL, an advantage of the technical solution is that it is similar to layer grouping based on QCL parameter information of the antenna ports corresponding to the layers.

In some embodiments, layers may be grouped based on a base station grouping status, generally, a quantity of base stations (TRP) for a coordinated operation is 2, a base station 1 (TRP1) and a base station 2 (TRP2) are grouped into two groups, the layers to which the base station 1 (TRP 1) needs to be mapped are grouped into one group, and the layers to which the base station 2 (TRP 2) needs to be mapped are grouped into one group. In this grouping manner, it is considered that the antenna ports corresponding to the layers to which data needs to be mapped in the same base station (TRP) are similar in transmission performance and quality. The quantity of the base stations (TRP) may be greater than 2, the base stations (TRP) may be first grouped based on the transmission performance or QCL information, and then the layers to which data needs to be mapped in the same group of base stations (TRP) are grouped into one group.

In some embodiments, corresponding to a scenario shown in FIG. 2 (c), the layers may be grouped based on a beam ID. That is, if antenna ports corresponding to each layer have a same beam ID (that is, the antenna ports belong to a same beam or form a beam), the antenna ports are grouped into one group; otherwise, the antenna ports are grouped into different groups. This can ensure that each CBG is mapped to one or more beams, and the data carried on each beam does not come from different CBGs.

In the foregoing cases, at least one of the QCL grouping information, DMRS port grouping information, or beam ID may be indicated to the terminal by using signaling, so that the terminal may learn the layer grouping status, that is, which layers are grouped into one group. For example, the terminal is dynamically informed by using radio resource control configuration or using a master information block (MIB) message, a system information block (SIB) message, radio resource control (RRC) signaling, a media access control element (MAC CE) or DCI; or considering that the DMRS port grouping information, and the like, may be learned by the terminal by using another processing process, for example, in NR, the base station is supported to inform the terminal of the DMRS port grouping information, and then the terminal may directly use the information without being informed again by the base station, thereby reducing overheads.

In some scenarios, regardless of the quantity of layers, all layers are grouped into one group, that is, the layers are grouped based on a scenario condition. For example, for a scenario of self-contain HARQ service, a high delay is not allowed, an acknowledgment response feedback or an unacknowledgment response feedback needs to be sent in a same transmission time unit, and therefore, interference cancellation cannot be used or does not need to be used for data processing; or for a scenario of withstanding ultra-reliable low latency communication (ultra-reliable low latency communication, URLLC) preemption, a resource border that carries a CBG is limited with an "in the box" convention based on a symbol, a mini-slot (mini-slot), or a slot border, thereby better withstanding URLLC preemption, that is, only the symbol preempted by URLLC, the mini-slot, or the CBG on the slot needs to be retransmitted, and the layers do not need to be grouped into a plurality of groups. In the foregoing two scenarios, it may be set that N=1, that is, there is only one layer group.

Embodiment 3

Based on Embodiment 1, this embodiment includes all the technical solutions of Embodiment 1, and may include the technical solutions of Embodiment 2. In this embodiment, several manners of determining a CBG size are described.

Manner 1: Determine a TBS based on at least one of a quantity of RBs, a quantity of layers, and MCS allocated for a TB; then determine a quantity of CBs into which the TB is divided; and finally determine a quantity of CBs included in each CBG In this case, a size of each CBG is a sum of bits of the included CBs.

For example, determining the quantity of CBs into which a TB is divided may be as follows: It is assumed that the quantity of bits after the TB is added with CRC is B, if a maximum quantity of bits of a CB is Z (for example, 6144, or 8192 bits), and a quantity of CRC bits added to each CB is L, and then the quantity of CBs obtained by dividing a TB is: if B≤Z, the quantity of CBs is C=1; or if B>Z, the quantity of CBs is $$C = \left\lceil \frac{B}{Z-L} \right\rceil,$$

where ⌈ ⌉ is a rounding-up symbol.

The quantity of CBs included in each CBG may be determined based on the following two principles:

Principle 1: Ensure that the quantities of CBs or the quantities of bits included in all CBGs are equal or similar (that is, if the quantities cannot be exactly divided, ensure that the quantities in all the CBGs are basically consistent).

This manner is relatively simple, and the quantities of CBs included in all the CBGs are relatively balanced.

In an implementation, the quantity of CBGs is m, and m may be configured by a base station, and indicated to a terminal, or may be obtained through calculation based on a configured CBG granularity K (that is, an upper limit value of the quantity of CBs that can be included in each CBG), that is, $$m = \min\left(\left\lceil \frac{C}{K} \right\rceil, N_{CBG\_max}\right),$$

where $N_{CBG\_max}$ is the upper limit value of m. In m CBGs, a quantity of CBs included in the first $N_+$ CBGs is $C_+$, and a quantity of CBs included in the second $N_-$ CBGs is $C_-$. In this case, $$C_+ = \left\lceil \frac{C}{m} \right\rceil \text{ and } C_- = \left\lfloor \frac{C}{m} \right\rfloor.$$

$\lceil \ \rceil$ is a rounding-up symbol, and $\lfloor \ \rfloor$ is a rounding-down symbol.

$N_+ = C - mC_-$, $N_+ = C - mC_-$ (it may indicate the first $N_+$ CBGs, or may be the last $N_+$ CBGs); $N_- = m - N_+$ (correspondingly, it may indicate the last $N_-$ CBGs, or may be the first $N_-$ CBGs).

For example, the quantity of CBs obtained based on the TBS is C=15; the quantity of CBGs is m=4; $C_+ = 4$, $C_- = 3$, $N_+ = 3$, and $N_- = 1$ can be obtained, that is, the quantity of CBs in each of the three CBGs is 4, and the quantity of CBs in one CB group is 3. The CBs included in the four CBGs (assuming that 15 CBs of TB are numbered CB0 to CB14) are respectively numbered {CB0, CB1, CB2, CB3}, {CB4, CB5, CB6, CB7}, {CB8, CB9, CB10, CB11}, and {CB12, CB13, CB14}, or numbered {CB0, CB1, CB2}, {CB3, CB4, CB5, CB6}, {CB7, CB8, CB9, CB10}, and {CB11, CB12, CB13, CB14}. Further, the quantity of bits of each CBG is the sum of the bits of the CBs included in each CBG Principle 2: Ensure that the quantity of CBs or the quantity of bits of each CBG is directly proportional to the quantity of MCSs or the quantity of layers of each CBG In this manner, considering that the more layers are included in a layer group, the more CBs or bits can be carried, transmission performance of a communications system can be improved.

In one implementation, the quantity of CBGs is m, and m may be configured by the base station, and is indicated to the terminal, or may be obtained through calculation based on a configured CBG granularity K (that is, the upper limit value of the quantity of CBs that can be included in each CBG), that is, $$m = \min\left(\left\lceil \frac{C}{K} \right\rceil, N_{CBG\_max}\right),$$

it is assumed that the quantity of layers (or a quantity of REs) to which an $i^{th}$ CBG is mapped is $L_i$, the total quantity of layers (or the total quantity of REs) scheduled and allocated this time is $L_{total}$, and $1 \leq i \leq m$.

As described above, if the quantity of CBs obtained by dividing the TB is C, the quantity of CBs included in the $i^{th}$ CBG is:

$$N_{CB,i} = \left\lceil \frac{L_i C}{L_{total}} \right\rceil,$$

i=1, M–1; and when i=m, $$N_{CB,m} = C - \sum_{i=1}^{m-1} N_{CB,i}; \text{ or } N_{CB,i} = \left\lfloor \frac{L_i C}{L_{total}} \right\rfloor$$

i=2, . . . m; and when i=1, $$N_{CB,1} = C - \sum_{i=2}^{m} N_{CB,i}.$$

Further, the CB included in the CBG may be determined based on the CB number and the quantity of CBs included in the determined CBG $\lceil \ \rceil$ is a rounding-up symbol, and $\lfloor \ \rfloor$ is a rounding-down symbol.

In another implementation, the quantity of CBGs is m, and m may be configured by the base station, and is indicated to the terminal, or may be obtained through calculation based on a configured CBG granularity K (that is, the upper limit value of the quantity of CBs that can be included in each CBG), that is, $$m = \min\left(\left\lceil \frac{C}{K} \right\rceil, N_{CBG\_max}\right).$$

It is assumed that the quantity of layers (or the quantity of REs) to which an L CBG is mapped is $L_i$, a modulation order, a bit rate, or transmission efficiency, or an MCS value used by a $j^{th}$ layer is $Q_j$, and the total quantity of layers (or the total quantity of REs) scheduled and allocated this time is $Q_j$.

As described above, if the quantity of CBs obtained by dividing the TB is C, the quantity of CBs included in the $i^{th}$ CBG is:

$$N_{CB,i} = \left\lceil \frac{C \sum_{j \in CBGi的层}^{L_{total}} Q_j}{\sum_{j=1}^{L_{total}} Q_j} \right\rceil,$$

i=1, . . . M−1; and when i=m, $$N_{CB,m} = C - \sum_{i=1}^{m-1} N_{CB,i}; \text{ or } N_{CB,i} = \left\lceil \frac{C \sum_{j \in CBGi的层}^{L_{total}} Q_j}{\sum_{j=1}^{L_{total}} Q_j} \right\rceil$$

i=2, . . . m; and when i=1, $$N_{CB,1} = C - \sum_{i=2}^{m} N_{CB,i}.$$

Further, the CB included in the CBG may be determined based on the CB number and the quantity of CBs included in the determined CBG ⌈ ⌉ is a rounding-up symbol, and ⌊ ⌋ is a rounding-down symbol.

Manner 2: Determine the TBS based on the quantity of RBs, the quantity of layers, and the MCS that are allocated to the TB, and then determine the quantity of bits of each CBG according to either of the two principles in Manner 1. In some embodiments, finally determine the quantity of CBs included in each CBG In an implementation, the quantity of CBGs is m, and m may be configured by the base station, and is indicated to the terminal, or may be obtained through calculation based on the configured CBG granularity K (that is, the upper limit value of the quantity of bits that can be included in each CBG). According to the foregoing principle 1, in m CBGs, it is assumed that a quantity of bits included in the first M−1 CBGs is $B_+$, and a quantity of bits included in the second CBG is $B_-$; alternatively, in the m CBGs, a quantity of bits included in the second M−1 CBG is $B_+$, and a quantity of bits included in the first CBG is $B_-$. It is assumed that:

$$B_+ = \left\lceil \frac{B}{m} \right\rceil$$

and $B_- = B - mC_+$.

In another implementation, the quantity of CBGs is m, and m may be configured by the base station, and is indicated to the terminal, or may be obtained through calculation based on the configured CBG granularity K (that is, the upper limit value of the quantity of bits that can be included in each CBG), that is, $$m = \min\left(\left\lceil \frac{B}{K} \right\rceil, N_{CBG\_max}\right).$$

A quantity of layers (or the quantity of REs) to which the $i^{th}$ CBG is mapped is $L_i$, and a total quantity of layers (or a total quantity of REs) scheduled and allocated this time is $L_{total}$.

As described above, a quantity of bits of the TB is B (which may include a CRC of the TB). According to principle 2, a quantity of bits included in the $i^{th}$ CBG is:

$$N_{bit,i} = \left\lceil \frac{L_i B}{L_{total}} \right\rceil,$$

i=1, . . . M−1; and when i=m, $$N_{bit,m} = B - \sum_{i=1}^{m-1} N_{bit,i}; \text{ or } N_{bit,i} = \left\lceil \frac{L_i B}{L_{total}} \right\rceil$$

i=2, . . . m; and when i=1, $$N_{bit,1} = B - \sum_{i=2}^{m} N_{bit,i}.$$

Further, the bits included in each CBG are successively determined based on the foregoing determined quantity of bits of each CBG ⌈ ⌉ is a rounding-up symbol, and ⌊ ⌋ is a rounding-down symbol.

In still another implementation, the quantity of CBGs is m, and m may be configured by the base station, and is indicated to the terminal, or may be obtained through calculation based on the configured CBG granularity K (that is, the upper limit value of the quantity of bits that can be included in each CBG), that is, $$m = \min\left(\left\lceil \frac{B}{K} \right\rceil, N_{CBG\_max}\right).$$

The quantity of layers (or the quantity of REs) to which the $i^{th}$ CBG is mapped is $L_i$, the modulation order, the bit rate, the transmission efficiency, or the MCS value that is used by the $j^{th}$ layer is $Q_j$, and a total quantity of layers (or a total quantity of REs) scheduled and allocated this time is $L_{total}$.

As described above, a quantity of bits of the TB is B (which may include the CRC of the TB). According to principle 2, a quantity of bits included in the $i^{th}$ CBG is:

$$N_{bit,i} = \left\lceil \frac{B \sum_{j \in CBGi的层}^{L_{total}} Q_j}{\sum_{j=1}^{L_{total}} Q_j} \right\rceil,$$

i=1, . . . M−1; and when i=m, $$N_{bit,m} = B - \sum_{i=1}^{m-1} N_{bit,i}; \text{ or } N_{bit,i} = \left\lceil \frac{B \sum_{j \in CBGi的层}^{L_{total}} Q_j}{\sum_{j=1}^{L_{total}} Q_j} \right\rceil$$

i=2, ... m; and when i=1, $$N_{bit,1} = B - \sum_{i=2}^{m} N_{bit,i}.$$

Further, the bits included in each CBG are successively determined based on the foregoing determined quantity of bits of each CBG ⌈ ⌉ is a rounding-up symbol, and ⌊ ⌋ is a rounding-down symbol.

Manner 3: Determine the size of each CBG based on at least one of the quantity of RBs allocated to each CBG; the quantity of layers included in the corresponding layer group, or the MCS of each CBG; and then In some embodiments, determine the TBS as the sum of the size of each CBG included in the TB.

In some embodiments, CRC may be added to each CBG; or CRC may be added to the TB.

In some embodiments, after the size of each CBG is determined (for example, after the quantity of bits of each CBG is determined), each CBG may be further divided into CBs.

For example, it is assumed that the determined quantity of bits of the CBG is B (In some embodiments, the CBG is added with CRC, and B is the quantity of bits after CRC is included), the maximum quantity of bits of the CB is Z (for example, 6144 bits or 8192 bits), and the quantity of CRC bits added to each CB is L, and then the quantity of CBs into which the CBG is divided is: If B≤Z, the quantity of CBs is C=1; or if B >Z, the quantity of CBs is $$C = \left\lceil \frac{B}{Z - L} \right\rceil,$$

where ⌈ ⌉ is a rounding-up symbol.

Embodiment 4

Based on Embodiment 1, this embodiment includes all the technical solutions of Embodiment 1, and may In some embodiments include at least one technical solution of Embodiment 2 and Embodiment 3.

In this embodiment, there may be the following example cases for a modulation scheme, a bit rate, an MCS, a coding matrix, and the like that are configured for each CBG in the foregoing embodiments:

1. Modulation schemes, bit rates, MCSs, coding matrices, and the like that are of N CBGs are the same.

2. At least one of the modulation scheme, the bit rate, the MCS, the coding matrix, and the like that are of each of the N CBGs is different.

3. There are at least two CBGs in the N CBGs, and the at least two CBGs have at least one of different modulation schemes, different bit rates, and different precoding matrices.

4. There are at least two layers, and the at least two layers have at least one of different modulation schemes, different bit rates, and different precoding matrices.

Different modulation schemes, bit rates or precoding matrix schemes, bit rates or precoding matrices are used for different CBGs; that is, different modulation schemes, bit rates or precoding matrices may be configured based on channel quality of resources in which different CBGs are located, so as to obtain a performance gain of a communications system.

N≥1.

A transmit end may send control signaling to a receive end, where the control signaling includes at least one of a modulation scheme, a bit rate, an MCS, a coding scheme, and the like that correspond to each CBG and the control information may further include information such as a redundancy version (redundancy version, RV) or a new data indicator (new data indicator, NDI) of each CBG When the first case is used, the transmit end may send one piece of control information, including at least one of the modulation scheme, the bit rate, the MCS, the RV, the NDI, or the precoding scheme.

When different CBGs use different modulation schemes, bit rates, MCSs, or coding matrices, at least one of the modulation scheme, the bit rate, the MCS, the RV, the NDI, and the precoding scheme that correspond to each CBG may be sent. Alternatively, at least one of the modulation scheme, the code rate, the MCS, the RV, the NDI, and the coding scheme that correspond to one of the CBGs (for example, a CBG numbered 0) may be sent. At least one of the modulation scheme, the code rate, the MCS, the RV, the NDI, and the coding scheme of another CBG may be indicated by sending a corresponding difference value, thereby reducing indication overheads.

Embodiment 5

Based on Embodiment 1, this embodiment includes all the technical solutions of Embodiment 1, and may In some embodiments include at least one technical solution of Embodiment 2 to Embodiment 4.

In this embodiment, a related description of CBG resource mapping is provided.

The transmit end may map a CB of each CBG in the foregoing embodiments to a resource formed by "space domain (corresponding to a layer or an antenna port), frequency domain (corresponding to a subcarrier), and time domain (corresponding to a symbol)" by performing channel coding, rate matching, optional scrambling, and modulation. A resource mapping rule is as follows:

The data mapping of CBs in each CBG is to sequentially map each CBG to a resource on a layer in a layer group to which each CBG belongs in one of the following manners:

Manner 1: First frequency domain, then time domain, and finally space domain;

Manner 2: First frequency domain, then space domain, and finally time domain;

Manner 3: First space domain, then frequency domain, and finally time domain.

In Manner 2 and Manner 3, a time domain sequence comes last, and a data processing time of a transmit end or a receive end may be increased.

In some embodiments, the foregoing manners may be implemented in a predefined manner, or may be flexibly configured by using control signaling. For example, the control signaling may be an MIB message, a SIB message, a MAC CE, DCI, or the like.

Further, for each CBG it is assumed that a symbol sequence obtained after the CBG is modulated is $d(0), \ldots, d(M_{symb}-1)$, where $M_{symb}$ is a total quantity of modulation symbols of the CBG. The CBG is mapped to an RE that can be used for data communication. The RE may correspond to $x^v(k,l)$, where v, k, and l represent three dimensions. Specifically, v represents an index of a layer (a value range is a number of a layer to which the CBG is mapped); k represents an index of a time domain symbol; and 1 represents an index of a subcarrier (a value range depends on an allocated RB). Mapping may be implemented in a sequence corresponding to the foregoing three manners.

In some embodiments, in a mapping process, the transmit end may use an inter-symbol interleaving technology. For example, when a data volume of the data carried by a symbol exceeds one CB, the CB may be used for interleaving. For an interleaving manner, to put it simply, for example, bits included in m CBs in the symbol may be divided into n pieces of bit data: First, a first piece of bit data of the m CBs in the symbol is successively mapped to an RE corresponding to the symbol, and then a second piece of bit data of the m CBs is successively mapped to an RE corresponding to the symbol, and so on, until all bits included in the m CBs in the symbol are mapped. This can ensure that the data of each CB may be mapped to possibly wide frequency domain resource, so as to obtain frequency domain diversity, and improve transmission reliability.

In some embodiments, whether interleaving is performed or a specific interleaving manner may be predefined or flexibly configured by using control signaling. For example, a quantity of symbols in an interleaving range may also be predefined or configured. In the foregoing example, interleaving maybe performed in one symbol, which does not affect a decoding delay. However, for a high-speed scenario, because channel time varying is fast and a reference signal of a symbol in the middle or at the end of a time scheduling unit is used for channel estimation, a plurality of symbols may be used for inter-symbol interleaving. In addition, an interleaving granularity (that is, interleaving is performed every several bits, the granularity of each of the n pieces of bit data described above, or n) may also be predefined or flexibly configured by using control signaling. The control signaling may be a MIB message, a SIB message, a MAC CE, DCI, or the like.

In some embodiments, after performing the foregoing mapping, a transmit end may further perform a precoding operation on the mapped data. As described in Embodiment 4, a same precoding matrix or different precoding matrices may be used for different CBGs; and precoding may be separately performed for each CBG or may be performed jointly for the CBGs, and this is not limited herein.

After the foregoing processing is performed, an OFDM signal formed after the data is mapped to a resource may be sent to the receive end.

Embodiment 6

In this embodiment, how a receive end feeds back HARQ-ACK information of each CBG to a transmit end after receiving data is described. In some embodiments, at least one technical solution in Embodiment 1 to Embodiment 5 may be included.

It is assumed that a receive end feeds back HARQ-ACK including $$\sum_{1 \leq i \leq L} N_i$$

bits on a same (uplink) control information/time unit, L (an integer greater than or equal to 1) is a quantity of TBs, Ni (an integer greater than or equal to 1) is a quantity of feedback bits corresponding to an $i^{th}$ TB, and In some embodiments each bit corresponds to a decoding result of one CBG (HARQ-ACK information), i is an integer, and $1 \leq I \leq L$. L TBs may be the TBs transmitted on different layers, and/or different TRPs, and/or different carriers, and/or different time units (TTI) in MIMO. $N_i$ may be determined in the following manners.

Manner 1: Determine a quantity Ni of feedback bits based on a quantity of currently transmitted CBGs.

For example, for the $i^{th}$ TB, the quantity of CBGs is determined as 4 based on factors such as a TB size (for the process, refer to Embodiment 3 but the process is not limited to that in Embodiment 3, or the quantity of CBGs may be determined by using another method such as signaling configuration), and therefore, Ni=4. It is assumed that only two CBGs are subsequently retransmitted, then the quantity Ni of feedback bits is 2 subsequently. Each bit corresponds one CBG, and indicates whether the CBG is correctly decoded.

Alternatively, after Ni is determined by using the foregoing method, In some embodiments, one bit or one status value is added to indicate whether a TB passes a CRC check. The status value may be a numerical index formed by feedback bits or a resource used by control information/channel. This is not limited in the present invention.

Manner 2: Determine a quantity Ni of feedback bits based on a quantity of CBGs determined during initial transmission.

For example, for the $i^{th}$ TB, the quantity of CBGs is determined as 4 based on factors such as a TB size (for the process, refer to Embodiment 3 (but the process is not limited to that in Embodiment 3), or the quantity of CBGs may be determined by using another method such as signaling configuration), and therefore, Ni=4. Although only two CBGs are retransmitted in a subsequent transmission, Ni is still 4. Each bit corresponds one CBG and indicates whether the CBG is correctly decoded. If a CBG is not included in retransmitted data, a feedback bit corresponding to the CBG may be In some embodiments a last decoding result or a default ACK/NACK. If a TB does not pass the CRC check, information on each of the Ni bits is NACK.

Manner 3: A quantity of feedback bits of each TB is a fixed value.

For example, for the $i^{th}$ TB, regardless of a size of the TB, and regardless of whether the TB is initially transmitted or retransmitted, the quantity of feedback bits is M, and M is a fixed value (which may be configured by a system, for example, to be a maximum quantity of feedback bits of each TB supported by a system). In some embodiments, several bits in $i^{th}$ M bits correspond to the decoding result of each CBG of the $i^{th}$ TB. If a CBG is not included in retransmitted data, a feedback bit corresponding to the CBG may be In some embodiments a last decoding result or a default ACK/NACK. If a TB does not pass the CRC check, each of first several bits or M bits corresponding to the TB in LM bits is NACK. If it is detected that at least one TB is lost (that is, DTX or its scheduling information is not detected), each of the bits or M bits corresponding to each lost TB in the LM bits is NACK.

One or more of the foregoing manners may be specified or predefined by a system, or a manner to be used may be determined as required or may be configured by using signaling. For example, when there is no convergent feedback, manners 1 and 2 are applicable; otherwise, manner 3 is applicable.

Embodiment 7

Based on Embodiment 1, this embodiment includes all the technical solutions of Embodiment 1, and may In some embodiments include at least one technical solution of Embodiment 2 to Embodiment 6.

In this embodiment, a technical solution related to the following scenario is described: When a CBG is not correctly received by a receive end, a transmit end needs to retransmit the CBG.

With reference to a HARQ feedback principle and a solution of dividing a TB into CBGs, the transmit end may use a plurality of bits to perform HARQ feedback for the TB, where each feedback bit corresponds to one CBG; and is used to indicate whether the CBG is correctly received by the receive end (In some embodiments, refer to Embodiment 6). After receiving a plurality of feedback bits, the transmit end needs to retransmit only data corresponding to the CBG that is not correctly received (at least one CBG is not correctly received). Specifically, one of the following manners may be used for the retransmission:

Manner 1: A CBG that needs to be retransmitted (that is, a CBG that is not correctly received) may be mapped, in a same manner used when the CBG is initially transmitted, to each layer in a same layer group when the CBG is initially transmitted for retransmission. For example, a CBG that needs to be retransmitted (it is assumed that the quantity is one) is mapped to each layer in a first layer group for initial transmission, and the CBG is also mapped to the layer in the first layer group for retransmission.

Manner 2: A CBG that needs to be retransmitted (that is, a CBG that is not correctly received) is configured based on scheduling, for example, a control signaling indication, and is mapped to each layer included in a layer group indicated by the scheduling configuration for retransmission. The control signaling may be physical layer signaling or higher layer signaling, and is used to indicate the layer group corresponding to the retransmission. In some embodiments, during the scheduling configuration, a layer group with the best transmission performance is selected, based on transmission performance of the layer group, as the layer group corresponding to the retransmission. A CBG that needs to be retransmitted (it is assumed that one CBG needs to be retransmitted) is mapped to each layer in a first layer group, and the CBG may be mapped to each layer in a layer group with the best transmission performance for retransmission; and if a second layer group is a layer group with the best performance, the CBG is mapped to each layer in the second layer group for retransmission.

Manner 3: A CBG that needs to be retransmitted (that is, a CBG that is not correctly received) may be repeatedly mapped to a plurality of layer groups for retransmission in a single frequency network (single frequency network, SFN) manner. For example, a CBG that needs to be retransmitted (it is assumed that one CBG needs to be retransmitted) is mapped to each layer in a first layer group for initial transmission, and the CBG may be mapped to layers in a plurality of layer groups for retransmission. Each layer group that carries the CBG to be retransmitted may include same data of the CBG; and a same modulation manner and a same RV are used for each group.

Figure 11:
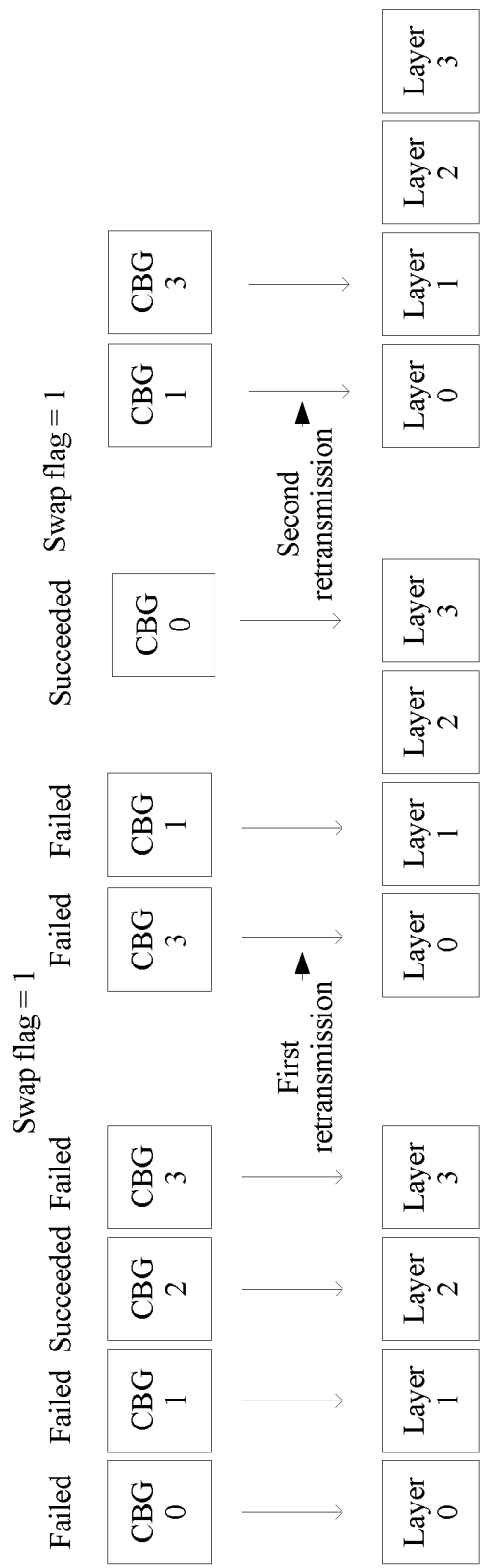
FIG. 11 (a) is a schematic diagram of a retransmission manner based on a swap flag indication according to an embodiment of this application.
Figure 11:
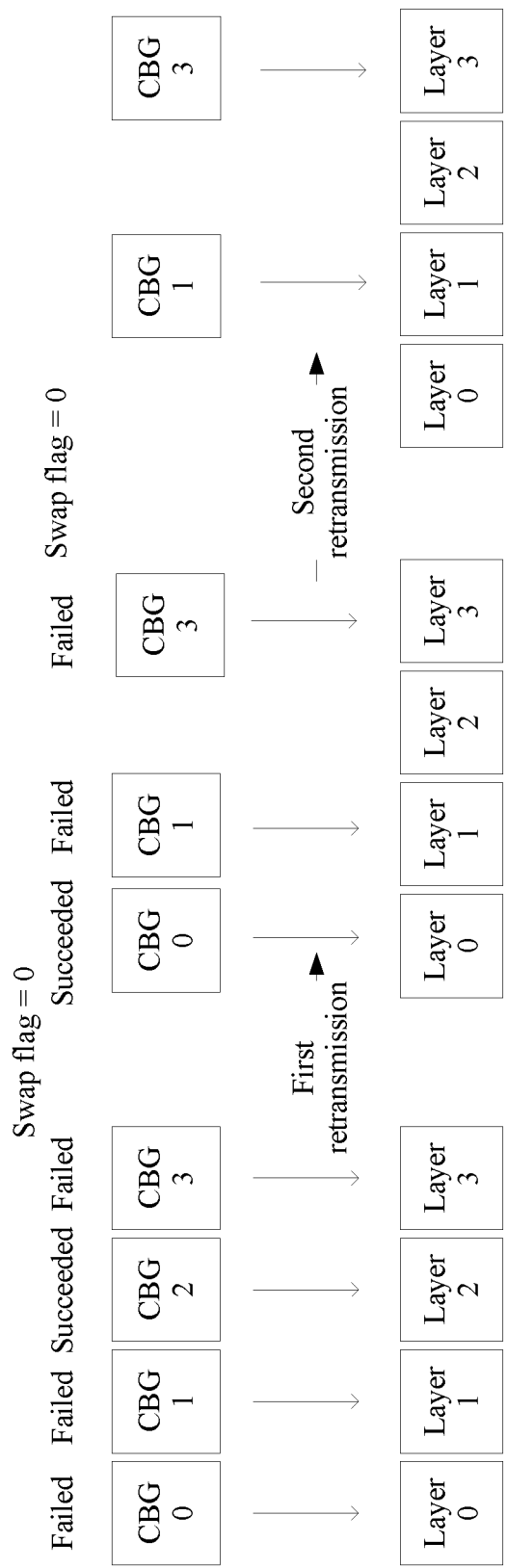

Manner 4: A CBG that needs to be retransmitted (that is, a CBG that is not correctly received) is mapped, based on a swap flag (swap flag) indication, to each layer in a layer group for retransmission. Swap flag=1 may correspond to "swap", and swap flag=0 may correspond to "do not swap". For example, N=4, the data corresponding to initially transmitted CBG 0, CBG 1, and CBG 3 is not correctly received, and then CBG 2 may be disabled to complete transmission for layer 2 corresponding to CBG 2. If swap flag=1, as shown in FIG. 11 (a), when a first retransmission is performed, the layer groups corresponding to CBG 0 and CBG 3 are swapped, that is, CBG 3 corresponds to a layer group that includes layer 0, CBG 1 still corresponds to a layer group that includes layer 1, and CBG 0 corresponds to a layer group that includes layer 3. In this retransmission, the data corresponding to CBG 1 and CBG 3 is still not correctly received, and CBG 0 may be disabled to complete transmission for layer 3 corresponding to CBG 0. In addition, in a second retransmission, because swap flag=1, swapping is performed again, CBG 1 may correspond to a layer group that includes layer 0, and CBG 3 may correspond to a layer group that includes layer 1. If swap flag=0, correspondingly, as shown in FIG. 11 (b), when a first retransmission is performed, CBG 0 still corresponds to a layer group that includes layer 0, CBG 1 still corresponds to a layer group that includes layer 1, and CBG 3 still corresponds to a layer group that includes layer 3. In this retransmission, the data corresponding to CBG 1 and CBG 3 is still not correctly received, and CBG 0 may be disabled to complete transmission for layer 0 corresponding to CBG 0. In a second retransmission, because swap flag=0, CBG 1 may correspond to a layer group that includes layer 1, and CBG 3 may correspond to a layer group that includes layer 3. Alternatively, a rule may be predefined for indication, instead of using the swap flag for indication; or the layer groups are swapped in sequence for execution by the transmit end.

In Manner 2, Manner 3, and Manner 4, a probability that retransmitted data is correctly received by the receive end is increased.

Embodiment 8

Figure 12:
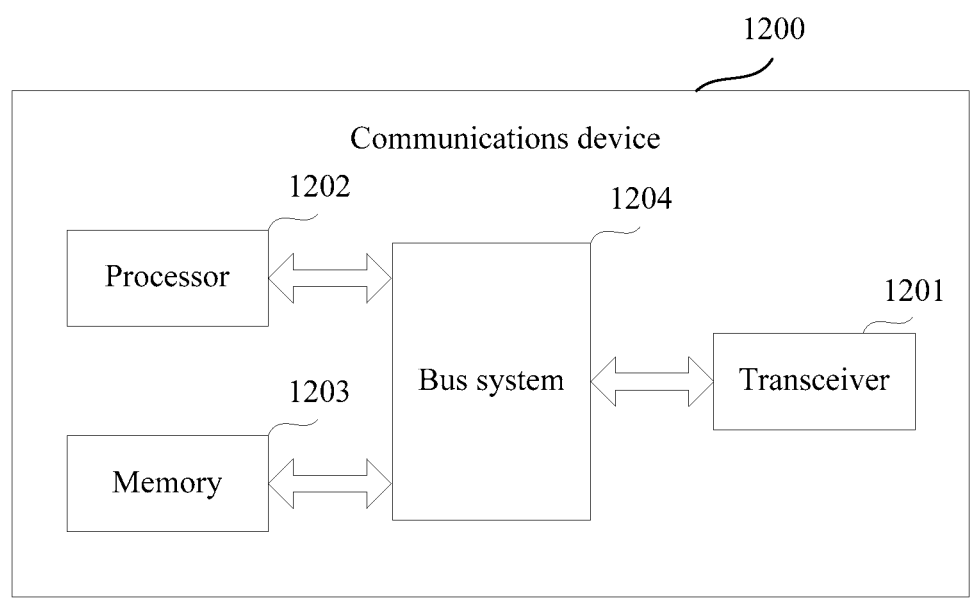
FIG. 12 is a schematic structural diagram of a communications device according to an embodiment of this application.

An embodiment provides a communications device 1200. As shown in FIG. 12, the communications device 1200 includes a transceiver 1201, a processor 1202, a memory 1203, and a bus system 1204.

The memory 1203 is configured to store a program. Specifically, the program may include program code, and the program code includes a computer operation instruction. The memory 1203 may be a random access memory (random access memory, RAM), or may be a non-volatile memory (non-volatile memory), for example, at least one magnetic disk memory. Only one memory is shown in the figure. Certainly, a plurality of memories may be provided as required. Alternatively, the memory 1203 may be a memory in the processor 1202.

The memory 1203 stores the following elements: an executable module or a data structure, a subset thereof, or an extended set thereof:

operation instructions, including various operation instructions used to implement various operations; and operating systems: including various system programs used to implement various basic services and process hardware-based tasks.

The processor 1202 controls an operation of the communications device 1200. The processor 1202 may be referred to as a CPU (Central Processing Unit, central processing unit). During specific application, components of the communications device 1200 are coupled together by using the bus system 1204. In addition to a data bus, the bus system 1204 includes a power bus, a control bus, and a status signal bus. However, for clear description, various types of buses in the figure are marked as the bus system 1204. For ease of illustration, FIG. 12 merely shows an example of the bus system 1204.

The method that is performed by the transmit end and that is disclosed in any one of Embodiment 1 to Embodiment 7, or the method that is performed by the receive end and that is disclosed in any one of Embodiment 1 to Embodiment 7 may be applied to the processor 1202, or implemented by the processor 1202. The processor 1202 may be an integrated circuit chip and has a signal processing capability. In an implementation process, steps in the foregoing methods can be implemented by using a hardware integrated logical circuit in the processor 1202, or by using instructions in a form of software. The processor 1202 may be a general purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in the embodiments of this application. The general purpose processor may be a microprocessor, or the processor may be any conventional processor and the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, and the like. The storage medium is located in the memory 1203. The processor 1202 reads information in the memory 1203, and performs the method steps of the transmit end described in any one of Embodiment 1 to Embodiment 7 with reference to hardware of the storage medium; or performs the method steps of the receive end described in any one of Embodiment 1 to Embodiment 7 with reference to hardware of the storage medium.

By using a communications device 1200 provided in this embodiment, a mapping relationship between a CBG and a layer group is established by grouping layers, so as to improve data reception quality, through interference cancellation, for transmission among different layer groups, and ensure adaptivity to a CBG-based retransmission feedback, thereby optimizing transmission performance of the entire communications system.

A person skilled in the art may further understand that various illustrative logical blocks (illustrative logic block) and steps (step) that are listed in the embodiments of this application may be implemented by using electronic hardware, computer software, or a combination thereof. In order to clearly display the interchangeability (interchangeability) between the hardware and the software, functions of the foregoing various illustrative components (illustrative components) and steps have been generally described. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of the present invention.

The various illustrative logical blocks, modules, and circuits described in the embodiments of this application may implement or operate the described functions by using a general processing unit, a digital signal processing unit, an application-specific integrated circuit (ASIC), a field programmable gate array (FPGA) or another programmable logical apparatus, a discrete gate or transistor logic, a discrete hardware component, or a design of any combination thereof. The general processing unit may be a microprocessing unit. In some embodiments, the general processing unit may be any conventional processing unit, controller, microcontroller, or state machine. The processing unit may be implemented by a combination of computing apparatuses, such as a digital signal processing unit and a microprocessing unit, multiple microprocessing units, one or more microprocessing units with a digital signal processing unit core, or any other similar configuration.

Steps of the methods or algorithms described in the embodiments of this application may be directly embedded into hardware, a software module executed by a processing unit, or a combination thereof. The software module may be stored in a RAM memory, a flash memory, a ROM memory, an EPROM memory, an EEPROM memory, a register, a hard disk, a removable disk, a CD-ROM, or a storage medium of any other form in the art. For example, the storage medium may connect to a processing unit so that the processing unit may read information from the storage medium and write information to the storage medium. Alternatively, the storage medium may be integrated into a processing unit. The processing unit and the storage medium may be arranged in an ASIC, and the ASIC may be arranged in a user terminal. Alternatively, the processing unit and the storage medium may be arranged in different components of the user terminal.

In one or more sample designs, the functions described in the embodiments of the present invention may be implemented by using hardware, software, firmware, or any combination thereof. If the present invention is implemented by software, these functions may be stored in a computer-readable medium or are transmitted to the computer-readable medium in a form of one or more instructions or code. The computer-readable medium is either a computer storage medium or a communications medium that enables a computer program to move from one place to another. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to carry or store program code, where the program code is in a form of an instruction or a data structure or in a form that can be read by a general or special computer or a general or special processing unit. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disc (disk) and the disk (disc) include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

According to the foregoing descriptions of this specification in the present invention, technologies in the art may use or implement the content of the present invention. Any modification based on the disclosed content shall be considered obvious in the art. The basic principles described in the present invention may be applied to other variations without departing from the essence and scope of the present invention. Therefore, the content disclosed in the present invention is not limited to the described embodiments and designs but may be extended to a maximum scope that is consistent with the principles and disclosed new features of the present invention.

What is claimed is:

1. A data communication method, wherein the method comprises:

mapping, by a transmit end, each code block group (CBG) in N CBGs to each layer comprised in a corresponding layer group based on a correspondence between the N CBGs and N layer groups, wherein each layer group comprises at least one layer, and N is a positive integer; and sending, by the transmit end, data to a receive end, wherein a transport block (TB) corresponding to the data comprises the N CBGs, wherein the N layer groups are grouped based on at least one piece of the following information: configured demodulation reference signal (DMRS) port group information, transmission and reception point (TRP) or TRP group information comprised in the transmit end, or identification information of a beam from the transmit end.

2. The method according to claim 1, wherein the N layer groups are further grouped based on quasi co-location (QCL) information among antenna ports corresponding to layers.

3. The method according to claim 1, wherein N>1, there are at least two CBGs in the N CBGs, and the two CBGs are configured with at least one of different modulation schemes, different bit rates, or different precoding matrices.

4. The method according to claim 1, wherein a total quantity of layers in the N layer groups is 1 or 2, N=1; or a total quantity of layers in the N layer groups is 3 or 4, N=1 or N=2.

5. The method according to claim 1, wherein a quantity of code blocks (CBs) or a quantity of bits comprised in each CBG is directly proportional to a quantity of layers comprised in the corresponding layer group;

a quantity of CBs or a quantity of bits comprised in each CBG is directly proportional to at least one of the following: a modulation order, a bit rate, or a transmission rate of the corresponding layer group; or a quantity of CBs or a quantity of bits comprised in each CBG is determined based on at least one of the following: a quantity of allocated resource blocks (RBs), a quantity of layers comprised in the corresponding layer group, and a modulation and coding scheme MCS of each CBG.

6. The method according to claim 1, wherein further comprising:

in response to a GBG in the N CBGs to be retransmitted, the CBG to be retransmitted is mapped to each layer comprised in a same layer group when the CBG is initially transmitted;

the CBG to be retransmitted is mapped to each layer comprised in at least one layer group in the N layer groups based on control signaling, and the at least one layer group is indicated by the control signaling;

the CBG to be retransmitted is mapped repeatedly to each layer in M layer groups in a single frequency network (SFN) manner, wherein a repetition quantity is M, 2≤M≤N, M is a positive integer and M layers groups are a subset of N layer groups; or the CBG that needs to be retransmitted is mapped to each layer comprised in at least one layer group in the N layer groups based on a swap flag indication.

7. A data communication method, wherein the method comprises:

receiving, by a receive end, data from a transmit end, wherein a transport block (TB) corresponding to the data comprises N code block groups (CBGs); and obtaining, by the receive end, the N CBGs from the data based on a correspondence between the N CBGs and N layer groups, wherein each layer group comprises at least one layer, each CBG is mapped to each layer in a corresponding layer group, and N is a positive integer, wherein the N layer groups are grouped based on at least one piece of the following information: configured demodulation reference signal (DMRS) port group information, transmission and reception point (TRP) or TRP group information comprised in the transmit end, or identification information of a beam from the transmit end.

8. The method according to claim 7, wherein the N layer groups are further grouped based on quasi co-location (QCL) information among antenna ports corresponding to layers.

9. The method according to claim 7, wherein N>1, there are at least two CBGs in the N CBGs, and the two CBGs are configured with at least one of different modulation schemes, different bit rates, or different precoding matrices.

10. The method according to claim 7, wherein when a total quantity of layers in the N layer groups is 1 or 2, N=1; or when a total quantity of layers in the N layer groups is 3 or 4, N=1 or N=2.

11. The method according to claim 7, wherein a quantity of code blocks (CBs) or a quantity of bits comprised in each CBG is directly proportional to a quantity of layers in the corresponding layer group;

a quantity of CBs or a quantity of bits in each CBG is directly proportional to at least one of the following: a modulation order, a bit rate, or a transmission rate of the corresponding layer group; or a quantity of CBs or a quantity of bits in each CBG is determined based on at least one of the following: a quantity of allocated resource blocks RBs, a quantity of layers comprised in the corresponding layer group, and a modulation and coding scheme MCS of each CBG.

12. The method according to claim 7, further comprising:
in response to a CBG in the N CBGs to be retransmitted, the CBG to be retransmitted is mapped to each layer comprised in a same layer group when the CBG is initially transmitted;

the CBG to be retransmitted is mapped to each layer comprised in at least one layer group in the N layer groups based on control signaling, and the at least one layer group is indicated by the control signaling;

the CBG to be retransmitted is mapped repeatedly to each layer comprised in M layer groups in a single frequency network SFN manner, wherein a quantity of repetitions is M, 2≤M≤N, M is a positive integer and M layer groups is a subset of N layer groups; or the CBG that needs to be retransmitted is mapped to each layer comprised in at least one layer group in the N layer groups based on a swap flag indication.

13. A data communication apparatus, comprising:
a processor; and
a non-transitory computer-readable storage medium storing a program to be executed by the processor, the program including instructions for:
mapping each code block group (CBG) in N CBGs to each layer comprised in a corresponding layer group based on a correspondence between the N CBGs and N layer groups, wherein each layer group comprises at least one layer, and N is a positive integer; and
sending data to a receive end, wherein a transport block (TB) corresponding to the data comprises the N CBGs, wherein the N layer groups are grouped based on at least one piece of the following information: configured demodulation reference signal (DMRS) port group information, transmission and reception point (TRP) or TRP group information comprised in the transmit end, or identification information of a beam from the transmit end.

14. The apparatus according to claim 13, wherein the N layer groups are further grouped based on quasi co-location (QCL) information among antenna ports corresponding to layers.

15. The apparatus according to claim 13, wherein N>1, there are at least two CBGs in the N CBGs, and the two CBGs are configured with at least one of different modulation schemes, different bit rates, or different precoding matrices.

16. The apparatus according to claim 13, wherein
when a total quantity of layers in the N layer groups is 1 or 2, N=1; or
when a total quantity of layers in the N layer groups is 3 or 4, N=1 or N=2.

17. A data communication apparatus, comprising:
a processor; and
a non-transitory computer-readable storage medium storing a program to be executed by the processor, the program including instructions for:
receiving data from a transmit end, wherein a transport block (TB) corresponding to the data comprises N code block groups (CBGs); and
obtaining the N CBGs from the data based on a correspondence between the N CBGs and N layer groups, wherein each layer group comprises at least one layer, each CBG is mapped to each layer comprised in a corresponding layer group, and N is a positive integer, wherein the N layer groups are grouped based on at least one piece of the following information: configured demodulation reference signal (DMRS) port group information, transmission and reception point (TRP) or TRP group information comprised in the transmit end, or identification information of a beam from the transmit end.

18. The apparatus according to claim 17, wherein the N layer groups are further grouped based on quasi co-location (QCL) information among antenna ports corresponding to layers.

19. The apparatus according to claim 17, wherein N>1, there are at least two CBGs in the N CBGs, and the two CBGs are configured with at least one of different modulation schemes, different bit rates, or different precoding matrices.

20. The apparatus according to claim 19, wherein
when a total quantity of layers in the N layer groups is 1 or 2, N=1; or
when a total quantity of layers in the N layer groups is 3 or 4, N=1 or N=2.

* * * * *